(12) United States Patent
Kobayashi et al.

(10) Patent No.: US 6,205,398 B1
(45) Date of Patent: *Mar. 20, 2001

(54) APPARATUS AND METHOD FOR NAVIGATION AND MEDIUM FOR PROVIDING THE METHOD

(75) Inventors: Masahiro Kobayashi, Tokyo; Hiroto Narioka; Kazushi Yoshida, both of Kanagawa, all of (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/439,278

(22) Filed: Nov. 12, 1999

(30) Foreign Application Priority Data

Nov. 20, 1998 (JP) .................................................. 10-330492

(51) Int. Cl.[7] ....................................................... G01C 21/00
(52) U.S. Cl. ............................. 701/209; 211/212; 211/23; 73/178 R
(58) Field of Search .................................. 701/209, 212, 701/23, 25, 26, 201, 202, 211; 342/46; 340/990, 995, 988; 73/178 R

(56) References Cited

U.S. PATENT DOCUMENTS 6,014,607 * 1/2000 Yagyu et al. ......................... 701/202

* cited by examiner

Primary Examiner—William A. Cuchlinski, Jr.
Assistant Examiner—Yonel Beaulieu
(74) Attorney, Agent, or Firm—Limbach & Limbach L.L.P.

(57) ABSTRACT

A navigation apparatus allowing a user to know an outline of a route searched for and selected. The apparatus includes: a searching element for searching for a route to a destination; a determining element for determining a pattern of the route searched for by the searching element; an extracting element for extracting information pertaining to the route searched for by the searching element; a preparing element for preparing an abstract of the route by applying the information extracted by the extracting element to the pattern determined by the determining element; and an outputting element for outputting the abstract of the route prepared by the preparing element.

18 Claims, 22 Drawing Sheets

F I G. 6

| CONDITIONS | PATTERNS |
|---|---|
| IF A TOLL ROAD TAKES UP AT LEAST 70% OF THE ENTIRE ROUTE (IF THREE ARE TWO OR MORE TOLL ROADS, THEIR LENGTHS ARE ADDED UP) | 1. TOLL ROAD INCLUDED |
| IF A NATIONAL ROUTE TAKES UP AT LEAST 70% OF THE ENTIRE ROUTE, WITHOUT PASSAGE THROUGH A TOLL ROAD (IF THERE ARE TWO OR MORE NATIONAL ROUTES, THEIR LENGTHS ARE ADDED UP) | 2. NATIONAL ROUTE INCLUDED |
| IF A TOLL ROAD TAKES UP LESS THAN 70% OF THE ENTIRE ROUTE, WITH PASSAGE THROUGH A NATIONAL ROUTE LOCATED BEFORE OR AFTER | 3, 4. TOLL ROAD + NATIONAL ROUTE |
| IF A NATIONAL ROUTE TAKES UP LESS THAN 70% OF THE ENTIRE ROUTE, WITHOUT PASSAGE THROUGH A TOLL ROAD BUT WITH PASSAGE THROUGH A MAIN ROUTE LOCATED BEFORE OR AFTER | 5, 6. NATIONAL ROUTE + MAIN ROUTE |
| IF THERE IS A MAIN ROUTE WITHOUT PASSAGE THROUGH A TOLL ROAD OR A NATIONAL ROUTE | 7. MAIN ROUTE INCLUDED |
| IF THERE IS NO PASSAGE THROUGH A TOLL ROAD, A NATIONAL ROUTE OR A MAIN ROUTE | 8. INTERSECTION ONLY |

FIG. 7

1. TOLL ROAD INCLUDED
   1.1 ONE TOLL ROAD
       TEMPLATE: THIS ROUTE WILL TAKE YOU FROM (INTERSECTION NAME) ON TO (ROAD NAME) AND OFF AT (EXIT NAME).
       EXAMPLE: THIS ROUTE WILL TAKE YOU FROM "YOGA" INTERSECTION ON TO METROPOLITAN EXPRESSWAY NO. 3 "SHIBUYA" ROUTE AND OFF AT "SHIBUYA" EXIT.
   1.2 TWO TOLL ROADS
       TEMPLATE: THIS ROUTE WILL TAKE YOU FROM (INTERSECTION NAME) ON TO (ROAD NAME) AND OFF (ROAD NAME) AT (EXIT NAME).
       EXAMPLE: THIS ROUTE WILL TAKE YOU FROM "SHIBUYA" INTERSECTION ON TO METROPOLITAN EXPRESSWAY NO. 3 "SHIBUYA" ROUTE AND OFF THE METROPOLITAN EXPRESS BELTWAY AT "SHIBAKOEN" EXIT.
   1.3 THREE TOLL ROADS
       TEMPLATE: THIS ROUTE WILL TAKE YOU FROM (INTERSECTION NAME) ON TO (ROAD NAME), THROUGH (ROAD NAME), AND OFF (ROAD NAME) AT (EXIT NAME).
       EXAMPLE: THIS ROUTE WILL TAKE YOU FROM "YOGA" INTERSECTION ON TO METROPOLITAN EXPRESSWAY NO. 3 "SHIBUYA" ROUTE, THROUGH THE METROPOLITAN EXPRESS BELTWAY, AND OFF METROPOLITAN EXPRESSWAY NO. 11 "DAIBA" ROUTE AT "DAIBA" EXIT.

2. NATIONAL ROUTE INCLUDED
   2.1 ONE NATIONAL ROUTE
       TEMPLATE: THIS ROUTE WILL TAKE YOU FROM (INTERSECTION NAME) ON TO (ROAD NAME).
       EXAMPLE: THIS ROUTE WILL TAKE YOU FROM "NAKAHARAGUCHI" INTERSECTION ON TO NATIONAL ROUTE NO. 1.
   2.2 TWO NATIONAL ROUTES
       TEMPLATE: THIS ROUTE WILL TAKE YOU FROM (INTERSECTION NAME) ON TO (ROAD NAME) AND THROUGH (ROAD NAME).
       EXAMPLE: THIS ROUTE WILL TAKE YOU FROM "NAKAHARAGUCHI" INTERSECTION ON TO NATIONAL ROUTE NO. 1 AND THROUGH NATIONAL ROUTE NO. 16.
   2.3 THREE NATIONAL ROUTES
       TEMPLATE: THIS ROUTE WILL TAKE YOU FROM (INTERSECTION NAME) ON TO (ROAD NAME), THROUGH (ROAD NAME), AND THEN THROUGH (ROAD NAME).
       EXAMPLE: THIS ROUTE WILL TAKE YOU FROM "NAKAHARAGUCHI" INTERSECTION ON TO NATIONAL ROUTE NO. 1, THROUGH NATIONAL ROUTE NO. 20, AND THEN THROUGH NATIONAL ROUTE NO. 16.

F I G. 8

3. TOLL ROAD(S) + NATIONAL ROUTE (BEFORE)
3-1 ONE TOLL ROAD + NATIONAL ROUTE
    TEMPLATE: THIS ROUTE WILL TAKE YOU THROUGH (NATIONAL ROUTE NAME), ON TO (ROAD NAME) FROM (INTERSECTION NAME), AND OFF AT (EXIT NAME).
    EXAMPLE: THIS ROUTE WILL TAKE YOU THROUGH NATIONAL ROUTE NO. 1, ON TO METROPOLITAN EXPRESSWAY NO. 2 "MEGURO" ROUTE FROM "TOGOSHI" INTERSECTION, AND OFF AT "MEGRO" EXIT.
3-2 TWO TOLL ROADS + NATIONAL ROUTE
    TEMPLATE: THIS ROUTE WILL TAKE YOU THROUGH (NATIONAL ROAD NAME), ON TO (ROAD NAME) FROM (INTERSECTION NAME), AND OFF (ROAD NAME) AT (EXIT NAME).
    EXAMPLE: THIS ROUTE WILL TAKE YOU THROUGH NATIONAL ROUTE NO. 246, ON TO METROPOLITAN EXPRESSWAY NO. 3 "SHIBUYA" ROUTE FROM "IKEJIRI" INTERSECTION, AND OFF THE METROPOLITAN EXPRESS BELTWAY AT "SHIBA-KOEN" EXIT.
3-3 THREE TOLL ROADS + NATIONAL ROUTE
    TEMPLATE: THIS ROUTE WILL TAKE YOU THROUGH (NATIONAL ROAD NAME), ON TO (ROAD NAME) FROM (INTERSECTION NAME), AND OFF (ROAD NAME) AT (EXIT NAME).
    EXAMPLE: THIS ROUTE WILL TAKE YOU THROUGH NATIONAL ROUTE NO. 246, ON TO METROPOLITAN EXPRESSWAY NO. 3 "SHIBUYA" ROUTE FROM "YOGA" INTERSECTION, AND OFF METROPOLITAN EXPRESSWAY NO. 2 "MEGURO" ROUTE AT "TENGENJI" EXIT.

4. TOLL ROAD(S) + NATIONAL ROUTE (AFTER)
4-1 ONE TOLL ROAD + NATIONAL ROUTE
    TEMPLATE: THIS ROUTE WILL TAKE YOU FROM (INTERSECTION NAME) ON TO (ROAD NAME), OFF AT (EXIT NAME), AND THROUGH (NATIONAL ROUTE NAME).
    EXAMPLE: THIS ROUTE WILL TAKE YOU FROM "MEGURO" INTERSECTION ON TO METROPOLITAN EXPRESSWAY NO. 2 "MEGURO" ROUTE, OFF AT "TOGOSHI" INTERSECTION, AND THROUGH NATIONAL ROUTE NO. 1.
4-2 TWO TOLL ROADS + NATIONAL ROUTE
    TEMPLATE: THIS ROUTE WILL TAKE YOU FROM (INTERSECTION NAME) ON TO (ROAD NAME), OFF (ROAD NAME) AT (EXIT NAME), AND THROUGH (NATIONAL ROUTE NAME).
    EXAMPLE: THIS ROUTE WILL TAKE YOU FROM "SHIBA-KOEN" INTERSECTION ON TO THE METROPOLITAN EXPRESS BELTWAY, OFF METROPOLITAN EXPRESSWAY NO. 3 "SHIBUYA" ROUTE AT "YOGA" EXIT, AND THROUGH NATIONAL ROUTE NO. 246.
4-3 THREE TOLL ROADS + NATIONAL ROUTE
    TEMPLATE: THIS ROUTE WILL TAKE YOU FROM (INTERSECTION NAME) ON TO (ROAD NAME), OFF (ROAD NAME) AT (EXIT NAME), AND THROUGH (NATIONAL ROUTE NAME).
    EXAMPLE: THIS ROUTE WILL TAKE YOU FROM "TENGENJI" INTERSECTION ON TO METROPOLITAN EXPRESSWAY NO. 2 "MEGURO" ROUTE, OFF METROPOLITAN EXPRESSWAY NO. 3 "SHIBUYA" ROUTE AT "YOGA" EXIT, AND THROUGH NATINAL ROUTE NO. 246.

FIG. 9

5. NATIONAL ROUTE(S) + MAIN ROUTE (BEFORE)
   5-1 ONE NATIONAL ROUTE + MAIN ROUTE
       TEMPLATE: THIS ROUTE WILL TAKE YOU THROUGH (MAIN ROUTE NAME) AND ON TO (ROAD NAME) FROM (INTERSECTION NAME).
       EXAMPLE: THIS ROUTE WILL TAKE YOU THROUGH METROPOLITAN ROUTE NO. 417 AND ON TO NATIONAL ROUTE NO. 1 FROM "NAKAHARAGUCHI" INTERSECTION.
   5-2 TWO NATIONAL ROUTES + MAIN ROUTE
       TEMPLATE: THIS ROUTE WILL TAKE YOU THROUGH (MAIN ROUTE NAME), ON TO (ROAD NAME) FROM (INTERSECTION NAME), AND THROUGH (ROAD NAME).
       EXAMPLE: THIS ROUTE WILL TAKE YOU THROUGH METROPOLITAN ROUTE NO. 417, ON TO NATIONAL ROUTE NO. 1 FROM "NAKAHARAGUCHI" INTERSECTION, AND THROUGH NATIONAL ROUTE NO. 16.
   5-3 THREE OR MORE NATIONAL ROUTES + MAIN ROUTE
       TEMPLATE: THIS ROUTE WILL TAKE YOU THROUGH (MAIN ROUTE NAME), ON TO (ROAD NAME) FROM (INTERSECTION NAME), AND THROUGH (ROAD NAME).
       EXAMPLE: THIS ROUTE WILL TAKE YOU THROUGH METROPOLITAN ROUTE NO. 417, ON TO NATIONAL ROUTE NO. 1 FROM "NAKAHARAGUCHI" INTERSECTION, AND THROUGH NATIONAL ROUTE NO. 16.

6. NATIONAL ROUTE(S) + MAIN ROUTE (AFTER)
   6-1 ONE NATIONAL ROUTE + MAIN ROUTE
       TEMPLATE: THIS ROUTE WILL TAKE YOU FROM (INTERSECTION NAME) ON TO ((ROAD NAME), OFF AT (INTERSECTION NAME), AND THROUGH (MAIN ROUTE NAME).
       EXAMPLE: THIS ROUTE WILL TAKE YOU FROM "NAKAHARAGUCHI" INTERSECTION ON TO NATIONAL ROUTE NO. 1, OFF AT "AOKIBASHI" INTERSECTION, AND THROUGH THE "TSUNASHIMA" ROUTE.
   6-2 TWO NATIONAL ROUTES + MAIN ROUTE
       TEMPLATE: THIS ROUTE WILL TAKE YOU FROM (INTERSECTION NAME) ON TO (ROAD NAME), OFF (ROAD NAME) AT (INTERSECTION NAME), AND THROUGH (MAIN ROUTE NAME).
       EXAMPLE: THIS ROUTE WILL TAKE YOU FROM "NAKAHARAGUCHI" INTERSECTION ON TO NATIONAL ROUTE NO. 1, OFF NATIONAL ROUTE NO. 16 AT "KEISATSUSHO-MAE" INTERSECTION, AND THROUGH THE "TSUNASHIMA" ROUTE.
   6-3 THREE OR MORE NATIONAL ROUTES + MAIN ROUTE
       TEMPLATE: THIS ROUTE WILL TAKE YOU FROM (INTERSECTION NAME) ON TO (ROAD NAME), OFF (ROAD NAME) AT (INTERSECTION NAME), AND THROUGH (MAIN ROUTE NAME).
       EXAMPLE: THIS ROUTE WILL TAKE YOU FROM "NAKAHARAGUCHI" INTERSECTION ON TO NATIONAL ROUTE NO. 1, OFF NATIONAL ROUTE NO. 16 AT "KITANO-CHO" INTERSECTION, AND THROUGH THE "TSUNASHIMA" ROUTE.

FIG. 10

7. MAIN ROUTE(S) INCLUDED
  7-1 ONE MAIN ROUTE TO PASS THROUGH
    TEMPLATE: THIS ROUTE WILL TAKE YOU FROM (INTERSECTION NAME) ON TO (ROAD NAME).
    EXAMPLE: THIS ROUTE WILL TAKE YOU FROM "MINAMI-KOMAGOME" INTERSECTION ON TO BELTWAY NO. 7.
  7-2 TWO MAIN ROUTES TO PASS THROUGH
    TEMPLATE: THIS ROUTE WILL TAKE YOU FROM (INTERSECTION NAME) ON TO (ROAD NAME) AND THROUGH (ROAD NAME).
    EXAMPLE: THIS ROUTE WILL TAKE YOU FROM "MINAMI-KOMAGOME" INTERSECTION ON TO BELTWAY NO. 7 AND THROUGH THE "MEGURO" ROUTE.
  7-3 THREE OR MORE MAIN ROUTES TO PASS THROUGH
    TEMPLATE: THIS ROUTE WILL TAKE YOU FROM (INTERSECTION NAME) ON TO (ROAD NAME), THROUGH (ROAD NAME), AND THEN THROUGH (ROAD NAME).
    EXAMPLE: THIS ROUTE WILL TAKE YOU FROM "MINAMI-KOMAGOME" INTERSECTION ON TO BELTWAY NO. 7, THROUGH THE "MEGURO" ROUTE, AND THEN THROUGH BELTWAY NO. 8.

8. INTERSECTION(S) INCLUDED
  8-1 ONE INTERSECTION TO PASS THROUGH
    TEMPLATE: THIS ROUTE WILL TAKE YOU THROUGH (INTERSECTION NAME).
    EXAMPLE: THIS ROUTE WILL TAKE YOU THROUGH "WAKAMATSU-CHO" INTERSECION.
  8-2 TWO OR MORE INTERSECTIONS TO PASS THROUGH
    TEMPLATE: THIS ROUTE WILL TAKE YOU THROUGH (INTERSECTION NAME) AND THEN THROUGH (INTERSECTION NAME).
    EXAMPLE: THIS ROUTE WILL TAKE YOU THROUGH "SHOTO-ICHOME" INTESECTION AND THEN THROUGH "HIGASHI-KAIGAN" INTERSECTION.

FIG. 13

1. TOLL ROAD(S) INCLUDED (TOLL ROADS ONLY)

| | ROAD TO TAKE | ROAD TO EXIT FROM | INTER-SECTION TO ENTER FROM | INTER-SECTION TO EXIT FROM | ROAD TO PASS THROUGH (THE LONGEST ROAD OTHER THAN THE FIRST OR THE LAST ROAD TO TAKE) | REMARKS |
|---|---|---|---|---|---|---|
| 1.1 ONE TOLL ROAD | O | O | O | O | | THIS ROUTE WILL TAKE YOU FROM (INTERSECTION NAME) ON TO (ROAD NAME) AND OFF AT (EXIT NAME). |
| | O | O | O | X | | THIS ROUTE WILL TAKE YOU FROM (INTERSECTION NAME) ON TO (ROAD NAME). |
| | O | O | X | O | | THIS ROUTE WILL TAKE YOU ON TO (ROAD NAME) AND OFF AT (EXIT NAME). |
| | O | X | – | – | | THIS ROUTE WILL TAKE YOU THROUGH (ROAD NAME). |
| | X | | | | | NO TOLL ROAD DEEMED TO EXIST |
| 1.2 TWO TOLL ROADS CONNECTED | O | O | O | O | | THIS ROUTE WILL TAKE YOU FROM (INTERSECTION NAME) ON TO (ROAD NAME) AND OFF (ROAD NAME) AT (EXIT NAME). |
| 1.4 TWO TOLL ROADS NOT CONNECTED AND WITHOUT NATIONAL ROUTE IN BETWEEN | O | O | O | X | | THIS ROUTE WILL TAKE YOU FROM (INTERSECTION NAME) ON TO (ROAD NAME) AND OFF (ROAD NAME). |
| | O | O | X | O | | THIS ROUTE WILL TAKE YOU ON TO (ROAD NAME) AND OFF (ROAD NAME) AT (EXIT NAME). |
| | O | O | X | X | | THIS ROUTE WILL TAKE YOU ON TO (ROAD NAME) AND OFF (ROAD NAME). |
| | O | X | – | O | | THIS ROUTE WILL TAKE YOU FROM (INTERSECTION NAME) ON TO (ROAD NAME). |
| | O | X | – | X | | THIS ROUTE WILL TAKE YOU THROUGH (ROAD NAME) OFF (ROAD NAME) AT (EXIT NAME). |
| | X | X | – | – | | THIS ROUTE WILL TAKE YOU THROUGH (ROAD NAME). |
| 1.3 AT LEAST THREE TOLL ROADS (IF FOUR OR MORE TOLL ROADS EXIST, THE "ROAD TO PASS THROUGH" SHOULD BE THE LONGEST ROAD) | O | O | O | O | O | THIS ROUTE WILL TAKE YOU FROM (INTERSECTION NAME) ON TO (ROAD NAME), THROUGH (ROAD NAME) AND OFF (ROAD NAME) AT (EXIT NAME). |
| | O | O | O | O | X | THIS ROUTE WILL TAKE YOU FROM (INTERSECTION NAME) ON TO (ROAD NAME), THROUGH (ROAD NAME) AT (EXIT NAME). |
| | O | O | O | X | O | THIS ROUTE WILL TAKE YOU FROM (INTERSECTION NAME) ON TO (ROAD NAME), THROUGH (ROAD NAME), AND OFF (ROAD NAME). |
| | O | O | X | O | O | THIS ROUTE WILL TAKE YOU ON TO (ROAD NAME), THROUGH (ROAD NAME), AND OFF (ROAD NAME) AT (EXIT NAME). |
| | O | O | X | X | O | THIS ROUTE WILL TAKE YOU ON TO (ROAD NAME), THROUGH (ROAD NAME) AND OFF (ROAD NAME). |
| | O | X | – | O | O | THIS ROUTE WILL TAKE YOU FROM (INTERSECTION NAME) ON TO (ROAD NAME) AND OFF (ROAD NAME) AT (EXIT NAME). |
| | O | X | – | X | O | THIS ROUTE WILL TAKE YOU FROM (INTERSECTION NAME) ON TO (ROAD NAME) AND OFF (ROAD NAME). |
| | X | – | – | O | O | THIS ROUTE WILL TAKE YOU THROUGH (ROAD NAME) AND OFF (ROAD NAME) AT (EXIT NAME). |
| | X | – | – | X | O | THIS ROUTE WILL TAKE YOU THROUGH (ROAD NAME). |
| 1.5 TWO TOLL ROADS NOT CONNECTED AND WITH NATIONAL ROUTE IN BETWEEN | O | O | O | O | O | THIS ROUTE WILL TAKE YOU ON TO (ROAD NAME) AND THROUGH (ROAD NAME). |
| | O | O | O | X | O | THIS ROUTE WILL TAKE YOU FROM (INTERSECTION NAME) ON TO (ROAD NAME). |
| | O | O | X | O | O | THIS ROUTE WILL TAKE YOU ON TO (ROAD NAME). |
| | O | X | – | O | X | THIS ROUTE WILL TAKE YOU THROUGH (ROAD NAME), AND OFF (ROAD NAME) AT (EXIT NAME). |
| | O | X | – | X | O | THIS ROUTE WILL TAKE YOU THROUGH (ROAD NAME), AND OFF (ROAD NAME). |
| | X | X | – | O | O | THIS ROUTE WILL TAKE YOU OFF (ROAD NAME) AT (EXIT NAME). |
| | X | X | – | X | O | THIS ROUTE WILL TAKE YOU THROUGH (ROAD NAME). |
| | X | X | – | – | X | NO TOLL ROAD DEEMED TO EXIST |

FIG.14

| 2. NATIONAL ROUTE(S) INCLUDED | (NATIONAL ROUTES ONLY) | | | | REMARKS |
|---|---|---|---|---|---|
| | FIRST ROAD TO TAKE | LAST ROAD TO TAKE | INTER-SECTION TO ENTER | ROAD TO PASS THROUGH (THE LONGEST ROAD OTHER THAN THE FIRST OR THE LAST ROAD TO TAKE) | |
| 2.1 ONE NATIONAL ROUTE TO PASS THROUGH | ○ | ○ | ○ | | THIS ROUTE WILL TAKE YOU FROM (INTERSECTION NAME) ON TO (ROAD NAME). |
| | ○ | ○ | × | | THIS ROUTE WILL TAKE YOU THROUGH (ROAD NAME). |
| | × | | — | | NO NATIONAL ROUTE TO EXIST |
| 2.2 TWO NATIONAL ROUTES TO PASS THROUGH | ○ | ○ | ○ | | THIS ROUTE WILL TAKE YOU FROM (INTERSECTION NAME) ON TO (ROAD NAME) AND THROUGH (ROAD NAME). |
| | ○ | ○ | × | | THIS ROUTE WILL TAKE YOU ON TO (ROAD NAME) AND THROUGH (ROAD NAME). |
| | ○ | × | ○ | | THIS ROUTE WILL TAKE YOU FROM (INTERSECTION NAME) ON TO (ROAD NAME). |
| | ○ | × | × | | THIS ROUTE WILL TAKE YOU THROUGH (ROAD NAME). |
| | × | ○ | — | | THIS ROUTE WILL TAKE YOU THROUGH (ROAD NAME). |
| | × | × | — | | NO NATIONAL ROUTE TO EXIST |
| 2.3 THREE OR MORE NATIONAL ROUTES TO PASS THROUGH | ○ | ○ | ○ | ○ | THIS ROUTE WILL TAKE YOU FROM (INTERSECTION NAME) ON TO (ROAD NAME), AND THEN THROUGH (ROAD NAME). |
| | ○ | ○ | × | ○ | THIS ROUTE WILL TAKE YOU ON TO (ROAD NAME), THROUGH (ROAD NAME), AND THEN THROUGH (ROAD NAME). |
| | ○ | ○ | ○ | × | THIS ROUTE WILL TAKE YOU FROM (INTERSECTION NAME) ON TO (ROAD NAME). |
| | ○ | ○ | × | × | THIS ROUTE WILL TAKE YOU ON TO (ROAD NAME). |
| | ○ | × | ○ | ○ | THIS ROUTE WILL TAKE YOU FROM (INTERSECTION NAME) ON TO (ROAD NAME) AND THROUGH (ROAD NAME). |
| | ○ | × | × | ○ | THIS ROUTE WILL TAKE YOU FROM (INTERSECTION NAME) ON TO (ROAD NAME) AND THROUGH (ROAD NAME). |
| | × | ○ | ○ | ○ | THIS ROUTE WILL TAKE YOU FROM (INTERSECTION NAME) ON TO (ROAD NAME) AND THROUGH (ROAD NAME). |
| | × | × | × | ○ | THIS ROUTE WILL TAKE YOU THROUGH (ROAD NAME), AND THEN THROUGH (ROAD NAME). |
| | × | × | × | × | THIS ROUTE WILL TAKE YOU THROUGH (ROAD NAME). |
| | × | | | | NO NATIONAL ROUTE TO EXIST |

FIG.15A

3. TOLL ROAD(S) + NATIONAL ROUTE (BEFORE)

| | ROAD TO TAKE | ROAD TO EXIT FROM | INTERSECTION TO ENTER FROM | INTERSECTION TO EXIT FROM | ROAD TO PASS THROUGH (THE LONGEST ROAD OTHER THAN THE FIRST OR THE LAST ROAD TO TAKE) | REMARKS |
|---|---|---|---|---|---|---|
| 3.1 ONE TOLL ROAD + NATIONAL ROUTE | O | O | O | O | | THIS ROUTE WILL TAKE YOU THROUGH (NATIONAL ROUTE NAME), ON TO (ROAD NAME) FROM (INTERSECTION NAME), AND OFF AT (EXIT NAME). |
| | O | O | O | X | | THIS ROUTE WILL TAKE YOU THROUGH (NATIONAL ROUTE NAME) AND ON TO (ROAD NAME) FROM (INTERSECTION NAME). |
| | O | O | X | O | | THIS ROUTE WILL TAKE YOU THROUGH (NATIONAL ROUTE NAME), ON TO (ROAD NAME) AND OFF AT (EXIT NAME). |
| | O | O | X | X | | THIS ROUTE WILL TAKE YOU THROUGH (NATIONAL ROUTE NAME) AND ON TO (ROAD NAME). |
| | X | — | — | — | | NO TOLL ROAD DEEMED TO EXIST |
| 3.2 TWO TOLL ROADS CONNECTED + NATIONAL ROUTE | O | O | O | O | | THIS ROUTE WILL TAKE YOU THROUGH (NATIONAL ROUTE NAME), ON TO (ROAD NAME) AT (EXIT NAME), ON TO (ROAD NAME) FROM (INTERSECTION NAME). |
| | O | O | X | X | | THIS ROUTE WILL TAKE YOU THROUGH (NATIONAL ROUTE NAME) AND OFF (ROAD NAME). |
| 3.4 TWO TOLL ROADS NOT CONNECTED AND WITH ROAD OTHER THAN NATIONAL ROUTE IN BETWEEN + NATIONAL ROUTE | O | O | O | O | | THIS ROUTE WILL TAKE YOU THROUGH (NATIONAL ROUTE NAME), ON TO (ROAD NAME) AND ON TO (ROAD NAME) FROM (INTERSECTION NAME). |
| | O | O | O | X | | THIS ROUTE WILL TAKE YOU THROUGH (NATIONAL ROUTE NAME) AT (EXIT NAME). |
| | O | X | O | — | O | THIS ROUTE WILL TAKE YOU THROUGH (NATIONAL ROUTE NAME) AND OFF (ROAD NAME). |
| | O | X/O | — | — | O | THIS ROUTE WILL TAKE YOU THROUGH (NATIONAL ROUTE NAME) AND THROUGH (ROAD NAME) AND OFF (ROAD NAME). |
| | X | O | — | X | | THIS ROUTE WILL TAKE YOU THROUGH (NATIONAL ROUTE NAME) AND THEN THROUGH (ROAD NAME). |
| | X | X | — | — | | NO TOLL ROAD DEEMED TO EXIST |

| FIG.15A |
|---|
| FIG.15B |

3. TOLL ROAD(S) +NATIONAL ROUTE (BEFORE)

| | ROAD TO TAKE | ROAD TO EXIT FROM | INTER-SECTION TO ENTER | INTER-SECTION TO EXIT FROM | ROAD TO PASS THROUGH (THE LONGEST ROAD OTHER THAN THE FIRST OR THE LAST ROAD TO TAKE) | REMARKS |
|---|---|---|---|---|---|---|
| 3.3 AT LEAST THREE TOLL ROADS+NATIONAL ROUTE (IF FOUR OR MORE TOLL ROADS EXIST, THE "ROAD TO PASS THROUGH" SHOULD BE THE LONGEST ROAD) | O | O | O | O | O | THIS ROUTE WILL TAKE YOU THROUGH (NATIONAL ROUTE NAME), ON TO (ROAD NAME) FROM (INTERSECTION NAME), AND OFF (ROAD NAME) AT (EXIT NAME). |
| | O | O | O | O | O | THIS ROUTE WILL TAKE YOU THROUGH (NATIONAL ROUTE NAME), ON TO (ROAD NAME) FROM (INTERSECTION NAME), AND OFF (ROAD NAME). |
| | O | O | X | O | O | THIS ROUTE WILL TAKE YOU THROUGH (NATIONAL ROUTE NAME), ON TO (ROAD NAME), AND OFF (ROAD NAME) AT (EXIT NAME). |
| | O | O | X | X | O | THIS ROUTE WILL TAKE YOU THROUGH (NATIONAL ROUTE NAME), ON TO (ROAD NAME), AND OFF (ROAD NAME). |
| | O | O | O | O | X | THIS ROUTE WILL TAKE YOU THROUGH (NATIONAL ROUTE NAME), ON TO (ROAD NAME) AT (EXIT NAME). |
| 3.5 TWO TOLL ROADS NOT CONNECTED AND WITH NATIONAL ROUTE IN BETWEEN+NATIONAL ROUTE | O | O | X | X | X | THIS ROUTE WILL TAKE YOU THROUGH (NATIONAL ROUTE NAME), ON TO (ROAD NAME). |
| | O | O | O | O | O | THIS ROUTE WILL TAKE YOU THROUGH (NATIONAL ROUTE NAME), ON TO (ROAD NAME). |
| | O | O | X | O | O | THIS ROUTE WILL TAKE YOU THROUGH (NATIONAL ROUTE NAME), ON TO (ROAD NAME) AT (EXIST NAME). |
| | O | O | O | X | X | THIS ROUTE WILL TAKE YOU THROUGH (NATIONAL ROUTE NAME), ON TO (ROAD NAME). |
| | O | O | X | — | O | THIS ROUTE WILL TAKE YOU THROUGH (NATIONAL ROUTE NAME), AND THROUGH (ROAD NAME), AND ON TO (ROAD NAME) FROM (INTERSECTION NAME). |
| | O | X | O | — | X | THIS ROUTE WILL TAKE YOU THROUGH (NATIONAL ROUTE NAME), AND ON TO (ROAD NAME) AT (EXIT NAME). |
| | O | X | X | O | O | THIS ROUTE WILL TAKE YOU THROUGH (NATIONAL ROUTE NAME), AND ON TO (ROAD NAME), THROUGH (ROAD NAME), AND THROUGH (ROAD NAME), AND OFF (ROAD NAME). |
| | O X | O | — | X | O | THIS ROUTE WILL TAKE YOU THROUGH (NATIONAL ROUTE NAME), THROUGH (ROAD NAME), AND OFF (ROAD NAME). |
| | X | O | — | O | O | THIS ROUTE WILL TAKE YOU THROUGH (NATIONAL ROUTE NAME) AND OFF (ROAD NAME), AT (EXIT NAME). |
| | X | O | — | X | X | THIS ROUTE WILL TAKE YOU THROUGH (NATIONAL ROUTE NAME) AND THROUGH (ROAD NAME). |
| | X X X | O X X | — | X — | O X | THIS ROUTE WILL TAKE YOU THROUGH (NATIONAL ROUTE NAME) AND THROUGH (ROAD NAME). NO TOLL ROAD DEEMED TO EXIST |

FIG.16A

4. TOLL ROAD(S)
+NATIONAL ROUTE
(AFTER)

| | ROAD TO TAKE | ROAD TO EXIT FROM | INTER-SECTION TO ENTER FROM | INTER-SECTION TO EXIT FROM | ROAD TO PASS THROUGH (THE LONGEST ROAD OTHER THAN THE FIRST OR THE LAST ROAD TO TAKE) | REMARKS |
|---|---|---|---|---|---|---|
| 4.1 ONE TOLL ROAD +NATIONAL ROUTE | ○ | ○ | ○ | ○ | ○ | THIS ROUTE WILL TAKE YOU FROM (INTERSECTION NAME) ON TO (ROAD NAME), OFF AT (EXIT NAME), AND THROUGH (NATIONAL ROUTE NAME). |
| | ○ | ○ | ○ | × | ○ | THIS ROUTE WILL TAKE YOU FROM (INTERSECTION NAME) ON TO (ROAD NAME), AND THROUGH (NATIONAL ROUTE NAME). |
| | ○ | ○ | × | ○ | ○ | THIS ROUTE WILL TAKE YOU ON TO (ROAD NAME), OFF AT (EXIT NAME), AND THROUGH (NATIONAL ROUTE NAME). |
| | ○ | ○ | × | × | ○ | THIS ROUTE WILL TAKE YOU ON TO (ROAD NAME) AND THROUGH (NATIONAL ROUTE NAME). |
| | × | × | — | — | — | NO TOLL ROAD DEEMED TO EXIST |
| 4.2 TWO TOLL ROADS CONNECTED+NATIONAL ROUTE | ○ | ○ | ○ | ○ | ○ | THIS ROUTE WILL TAKE YOU FROM (INTERSECTION NAME) ON TO (ROAD NAME), AND THROUGH (NATIONAL ROUTE NAME), OFF (ROAD NAME). |
| | ○ | ○ | ○ | × | ○ | THIS ROUTE WILL TAKE YOU FROM (INTERSECTION NAME) ON TO (ROAD NAME), AND THROUGH (NATIONAL ROUTE NAME). |
| 4.4 TWO TOLL ROADS NOT CONNECTED AND WITH ROAD OTHER THAN NATIONAL ROUTE IN BETWEEN+ NATIONAL ROUTE | ○ | ○ | × | × | ○ | THIS ROUTE WILL TAKE YOU ON TO (ROAD NAME), OFF (ROAD NAME) AT (EXIT NAME), AND THROUGH (NATIONAL ROUTE NAME). |
| | ○ | × | × | ○ | — | THIS ROUTE WILL TAKE YOU ON TO (ROAD NAME), OFF (ROAD NAME), AND THROUGH (NATIONAL ROUTE NAME). |
| | ○ | ○ | × | — | ○ | THIS ROUTE WILL TAKE YOU FROM (INTERSECTION NAME) ON TO (ROAD NAME) AND THROUGH (NATIONAL ROUTE NAME). |
| | ○ | ×○ | × | ○ | ○ | THIS ROUTE WILL TAKE YOU ON TO (ROAD NAME), AND THROUGH (NATIONAL ROUTE NAME). |
| | × | ○× | — | × | — | THIS ROUTE WILL TAKE YOU OFF (ROAD NAME) AT (EXIT NAME) AND THROUGH (NATIONAL ROUTE NAME). |
| | × | × | — | — | ○ | THIS ROUTE WILL TAKE YOU THROUGH (ROAD NAME) AND THROUGH (NATIONAL ROUTE NAME). |
| | × | × | — | — | — | NO TOLL ROAD DEEMED TO EXIST |

FIG.16

| FIG.16A |
|---|
| FIG.16B |

FIG. 16B

4. TOLL ROAD(S)
+NATIONAL ROUTE
(AFTER)

| | ROAD TO TAKE | ROAD TO EXIT FROM | INTERSECTION TO ENTER | INTERSECTION TO EXIT FROM | ROAD TO PASS THROUGH (THE LONGEST ROAD OTHER THAN THE FIRST OR THE LAST ROAD TO TAKE) | REMARKS |
|---|---|---|---|---|---|---|
| 4.3 AT LEAST THREE TOLL ROADS+NATIONAL ROUTE (IF FOUR OR MORE TOLL ROADS EXIST, THE "ROAD TO PASS THROUGH" SHOULD BE THE LONGEST ROAD) | O | O | O | O | O | THIS ROUTE WILL TAKE YOU FROM (INTERSECTION NAME) ON TO (ROAD NAME), OFF (ROAD NAME) AT (EXIT NAME), AND THROUGH (NATIONAL ROUTE NAME). |
| | O | O | O | × | O | THIS ROUTE WILL TAKE YOU FROM (INTERSECTION NAME) ON TO (ROAD NAME), OFF (ROAD NAME), AND THROUGH (NATIONAL ROUTE NAME). |
| | O | O | × | O | O | THIS ROUTE WILL TAKE YOU ON TO (ROAD NAME), OFF (ROAD NAME) AT (EXIT NAME), AND THROUGH (NATIONAL ROUTE NAME). |
| | O | O | × | × | O | THIS ROUTE WILL TAKE YOU ON TO (ROAD NAME), OFF (ROAD NAME), AND THROUGH (NATIONAL ROUTE NAME). |
| | O | O | O | O | × | THIS ROUTE WILL TAKE YOU FROM (INTERSECTION NAME) ON TO (ROAD NAME), OFF (ROAD NAME) AT (EXIT NAME), AND THROUGH (NATIONAL ROUTE NAME). |
| | O | O | O | × | × | THIS ROUTE WILL TAKE YOU FROM (INTERSECTION NAME) ON TO (ROAD NAME), AND THROUGH (NATIONAL ROUTE NAME). |
| 4.5 TWO TOLL ROADS NOT CONNECTED AND WITH NATIONAL ROUTE IN BETWEEN+NATIONAL ROUTE | O | O | × | O | × | THIS ROUTE WILL TAKE YOU ON TO (ROAD NAME), OFF (ROAD NAME) AT (EXIT NAME), AND THROUGH (NATIONAL ROUTE NAME). |
| | O | O | × | × | × | THIS ROUTE WILL TAKE YOU ON TO (ROAD NAME), OFF (ROAD NAME), AND THROUGH (NATIONAL ROUTE NAME). |
| | O | O | O | — | O | THIS ROUTE WILL TAKE YOU FROM (INTERSECTION NAME) ON TO (ROAD NAME), THROUGH (ROAD NAME), AND THEN THROUGH (NATIONAL ROUTE NAME). |
| | O | O | × | — | O | THIS ROUTE WILL TAKE YOU ON TO (ROAD NAME), THROUGH (ROAD NAME), AND THEN THROUGH (NATIONAL ROUTE NAME). |
| | O | O | O | — | × | THIS ROUTE WILL TAKE YOU FROM (INTERSECTION NAME) ON TO (ROAD NAME) AND THROUGH (NATIONAL ROUTE NAME). |
| | O× | ×O | × | O | ×O | THIS ROUTE WILL TAKE YOU ON TO (ROAD NAME) AND THROUGH (NATIONAL ROUTE NAME), OFF (ROAD NAME) AT (EXIT NAME), AND THROUGH (NATIONAL ROUTE NAME). |
| | × | O | — | × | O | THIS ROUTE WILL TAKE YOU THROUGH (ROAD NAME), OFF (ROAD NAME), AND THROUGH (NATIONAL ROUTE NAME). |
| | × | O | — | O | × | THIS ROUTE WILL TAKE YOU OFF (ROAD NAME) AT (EXIT NAME) AND THEN THROUGH (NATIONAL ROUTE NAME). |
| | × | O | — | × | × | THIS ROUTE WILL TAKE YOU THROUGH (ROAD NAME) AND THEN THROUGH (NATIONAL ROUTE NAME). |
| | × | × | — | — | O | THIS ROUTE WILL TAKE YOU THROUGH (ROAD NAME) AND THEN THROUGH (NATIONAL ROUTE NAME). |
| | × | × | — | — | × | NO TOLL ROAD DEEMED TO EXIST |

FIG. 17

5. NATIONAL ROUTE(S) +MAIN ROUTE (BEFORE)

| | FIRST ROAD TO TAKE | LAST ROAD TO TAKE | INTER-SECTION TO ENTER | ROAD TO PASS THROUGH (THE LONGEST ROAD OTHER THAN THE FIRST OR THE LAST ROAD TO TAKE) | REMARKS |
|---|---|---|---|---|---|
| 5.1 ONE NATIONAL ROUTE+MAIN ROUTE | ○ | ○ | ○ | | THIS ROUTE WILL TAKE YOU THROUGH (MAIN ROUTE NAME) AND ON TO (ROAD NAME) FROM (INTERSECTION NAME). |
| | ○ | ○ | × | | THIS ROUTE WILL TAKE YOU THROUGH (MAIN ROUTE NAME) AND ON TO (ROAD NAME). |
| | × | | — | | NO NATIONAL ROUTE DEEMED TO EXIST |
| 5.2 TWO NATIONAL ROUTES+MAIN ROUTE | ○ | ○ | ○ | | THIS ROUTE WILL TAKE YOU THROUGH (MAIN ROUTE NAME), ON TO (ROAD NAME) FROM (INTERSECTION NAME), AND THEN THROUGH (ROAD NAME). |
| | ○ | ○ | × | | THIS ROUTE WILL TAKE YOU THROUGH (MAIN ROUTE NAME), ON TO (ROAD NAME), AND THEN THROUGH (ROAD NAME). |
| | ○ | × | ○ | | THIS ROUTE WILL TAKE YOU THROUGH (MAIN ROUTE NAME) AND ON TO (ROAD NAME) FROM (INTERSECTION NAME). |
| | ○ | × | × | | THIS ROUTE WILL TAKE YOU THROUGH (MAIN ROUTE NAME) AND THEN THROUGH (ROAD NAME). |
| | × | ○ | — | | THIS ROUTE WILL TAKE YOU AND THEN THROUGH (ROAD NAME). |
| | × | × | — | | NO NATIONAL ROUTE DEEMED TO EXIST |
| 5.3 THREE OR MORE NATIONAL ROUTES+ MAIN ROUTE | ○ | ○ | ○ | ○ | THIS ROUTE WILL TAKE YOU THROUGH (MAIN ROUTE NAME), ON TO (ROAD NAME) FROM (INTERSECTION NAME), AND THEN THROUGH (ROAD NAME). |
| | ○ | ○ | × | ○ | THIS ROUTE WILL TAKE YOU THROUGH (MAIN ROUTE NAME), ON TO (ROAD NAME), AND THEN THROUGH (ROAD NAME). |
| | ○ | ○ | ○ | × | THIS ROUTE WILL TAKE YOU THROUGH (MAIN ROUTE NAME), ON TO (ROAD NAME) FROM (INTERSECTION NAME). |
| | ○ | ○ | × | × | THIS ROUTE WILL TAKE YOU THROUGH (MAIN ROUTE NAME), ON TO (ROAD NAME). |
| | ○ | × | ○ | ○ | THIS ROUTE WILL TAKE YOU THROUGH (MAIN ROUTE NAME) AND THEN THROUGH (ROAD NAME) THEN OFF (ROAD NAME). |
| | ○ | × | × | ○ | THIS ROUTE WILL TAKE YOU THROUGH (MAIN ROUTE NAME) AND THEN THROUGH (ROAD NAME). |
| | ○ | × | ○ | × | THIS ROUTE WILL TAKE YOU THROUGH (MAIN ROUTE NAME) AND ON TO (ROAD NAME) FROM (INTERSECTION NAME). |
| | ○ | × | × | × | THIS ROUTE WILL TAKE YOU THROUGH (MAIN ROUTE NAME). |
| | × | ○ | — | ○ | THIS ROUTE WILL TAKE YOU THROUGH (MAIN ROUTE NAME) AND THEN THROUGH (ROAD NAME), AND THEN THROUGH (ROAD NAME). |
| | × | × | — | ○ | THIS ROUTE WILL TAKE YOU THROUGH (MAIN ROUTE NAME), THROUGH (ROAD NAME). |
| | × | ○ | — | × | THIS ROUTE WILL TAKE YOU THROUGH (MAIN ROUTE NAME) AND THEN THROUGH (ROAD NAME). |
| | × | × | — | × | THIS ROUTE WILL TAKE YOU THROUGH (MAIN ROUTE NAME) AND THEN THROUGH (ROAD NAME). |
| | × | × | — | — | NO NATIONAL ROUTE DEEMED TO EXIST |

FIG. 18

6. NATIONAL ROUTE(S)+MAIN ROUTE (AFTER)

| | FIRST ROAD TO TAKE | LAST ROAD TO TAKE | INTER-SECTION TO ENTER | ROAD TO PASS THROUGH (THE LONGEST ROAD OTHER THAN THE FIRST OR THE LAST ROAD TO TAKE) | REMARKS |
|---|---|---|---|---|---|
| 6.1 ONE NATIONAL ROUTE+MAIN ROUTE | ○ | ○ | ○ | | THIS ROUTE WILL TAKE YOU FROM (INTERSECTION NAME) ON TO (ROAD NAME) AND THROUGH (MAIN ROUTE NAME). |
| | ○ | ○ | × | | THIS ROUTE WILL TAKE YOU FROM (INTERSECTION NAME) ON TO (ROAD NAME) AND THROUGH (MAIN ROUTE NAME). |
| | × | — | — | | NO NATIONAL ROUTE DEEMED TO EXIST |
| 6.2 TWO NATIONAL ROUTES+MAIN ROUTE | ○ | ○ | ○ | ○ | THIS ROUTE WILL TAKE YOU FROM (INTERSECTION NAME) ON TO (ROAD NAME), AND THEN THROUGH (MAIN ROUTE NAME). |
| | ○ | ○ | × | ○ | THIS ROUTE WILL TAKE YOU ON TO (ROAD NAME), THROUGH (ROAD NAME), AND THEN THROUGH (MAIN ROUTE NAME). |
| | ○ | × | ○ | ○ | THIS ROUTE WILL TAKE YOU FROM (INTERSECTION NAME) ON TO (ROAD NAME) AND THROUGH (MAIN ROUTE NAME). |
| | ○× | ×○ | ×— | — | THIS ROUTE WILL TAKE YOU THROUGH (ROAD NAME) AND THEN THROUGH (MAIN ROUTE NAME). THIS ROUTE WILL TAKE YOU THROUGH (ROAD NAME) AND THEN THROUGH (MAIN ROUTE NAME). |
| | × | × | — | — | NO NATIONAL ROUTE DEEMED TO EXIST |
| 6.3 THREE OR MORE NATIONAL ROUTES+MAIN ROUTE | ○ | ○ | ○ | ○ | THIS ROUTE WILL TAKE YOU FROM (INTERSECTION NAME) ON TO (ROAD NAME), AND THEN THROUGH (MAIN ROUTE NAME). |
| | ○ | ○ | × | ○ | THIS ROUTE WILL TAKE YOU ON TO (ROAD NAME), THROUGH (ROAD NAME), AND THEN THROUGH (MAIN ROUTE NAME). |
| | ○ | ○ | ○ | × | THIS ROUTE WILL TAKE YOU FROM (INTERSECTION NAME) ON TO (ROAD NAME), AND THEN THROUGH (MAIN ROUTE NAME). |
| | ○ | ○ | × | × | THIS ROUTE WILL TAKE YOU ON TO (ROAD NAME), OFF (ROAD NAME), AND THROUGH (MAIN ROUTE NAME). |
| | ○ | × | ○ | ○ | THIS ROUTE WILL TAKE YOU FROM (INTERSECTION NAME) ON TO (ROAD NAME), AND THEN THROUGH (MAIN ROUTE NAME). |
| | ○ | × | × | ○ | THIS ROUTE WILL TAKE YOU ON TO (ROAD NAME), THROUGH (ROAD NAME), AND THEN THROUGH (MAIN ROUTE NAME). |
| | ○ | × | ○ | × | THIS ROUTE WILL TAKE YOU FROM (INTERSECTION NAME) ON TO (ROAD NAME) AND THROUGH (MAIN ROUTE NAME). |
| | ○× | ×○ | ×— | ○× | THIS ROUTE WILL TAKE YOU THROUGH (ROAD NAME) AND THEN THROUGH (MAIN ROUTE NAME), AND THROUGH (MAIN ROUTE NAME). THIS ROUTE WILL TKAE YOU THROUGH (ROAD NAME), OFF (ROAD NAME), AND THROUGH (MAIN ROUTE NAME). |
| | ×× | ×× | —— | ×○× | THIS ROUTE WILL TAKE YOU THROUGH (ROAD NAME) AND THEN THROUGH (MAIN ROUTE NAME). THIS ROUTE WILL TAKE YOU THROUGH (ROAD NAME) AND THEN THROUGH (MAIN ROUTE NAME). NO NATIONAL ROUTE DEEMED TO EXIST |

FIG. 19

| 7. MAIN ROUTE(S) INCLUDED | | FIRST ROAD TO TAKE | LAST ROAD TO TAKE | INTER-SECTION TO ENTER | ROAD TO PASS THROUGH (THE LONGEST ROAD OTHER THAN THE FIRST OR THE LAST ROAD TO TAKE) | REMARKS |
|---|---|---|---|---|---|---|
| 7.1 ONE MAIN ROUTE TO PASS THROUGH | | ○ | ○ | ○ | | THIS ROUTE WILL TAKE YOU FROM (INTERSECTION NAME) ON TO (ROAD NAME). |
| | | ○ | ○ | × | | THIS ROUTE WILL TAKE YOU FROM (INTERSECTION NAME) ON TO (ROAD NAME). |
| | | × | | — | | NO MAIN ROUTE DEEMED TO EXIST |
| 7.2 TWO MAIN ROUTES TO PASS THROUGH | | ○ | ○ | ○ | | THIS ROUTE WILL TAKE YOU FROM (INTERSECTION NAME) ON TO (ROAD NAME) AND THROUGH (ROAD NAME). |
| | | ○ | ○ | × | | THIS ROUTE WILL TAKE YOU ON TO (ROAD MAIN) AND THROUGH (ROAD NAME). |
| | | ○ | × | ○ | | THIS ROUTE WILL TAKE YOU FROM (INTERSECTION NAME) ON TO (ROAD NAME). |
| | | ○ | × | × | | THIS ROUTE WILL TAKE YOU THROUGH (ROAD NAME). |
| | | × | ○ | — | | THIS ROUTE WILL TAKE YOU THROUGH (ROAD NAME). |
| | | × | × | — | | NO MAIN ROUTE DEEMED TO EXIST |
| 7.3 THREE OR MORE MAIN ROUTES TO PASS THROUGH | | ○ | ○ | ○ | ○ | THIS ROUTE WILL TAKE YOU FROM (INTERSECTION NAME) ON TO (ROAD NAME), THROUGH (ROAD NAME), AND THEN THROUGH (ROAD NAME). |
| | | ○ | ○ | × | ○ | THIS ROUTE WILL TAKE YOU ON TO (ROAD NAME), THROUGH (ROAD NAME), AND THEN THROUGH (ROAD NAME). |
| | | ○ | ○ | ○ | × | THIS ROUTE WILL TAKE YOU FROM (INTERSECTION NAME) ON TO (ROAD NAME) AND THROUGH (ROAD NAME). |
| | | ○ | ○ | × | × | THIS ROUTE WILL TAKE YOU ON TO (ROAD NAME) AND THROUGH (ROAD NAME). |
| | | ○ | × | ○ | ○ | THIS ROUTE WILL TAKE YOU FROM (INTERSECTION NAME) ON TO (ROAD NAME) AND THROUGH (ROAD NAME). |
| | | ○ | × | × | ○ | THIS ROUTE WILL TAKE YOU ON TO (ROAD NAME) AND THEN THROUGH (ROAD NAME). |
| | | ○ | × | ○ | × | THIS ROUTE WILL TAKE YOU FROM (INTERSECTION NAME) ON TO (ROAD NAME). |
| | | ○ | × | × | × | THIS ROUTE WILL TAKE YOU THROUGH (ROAD NAME). |
| | | × | ○ | — | ○ | THIS ROUTE WILL TAKE YOU THROUGH (ROAD NAME). |
| | | × | × | — | ○ | THIS ROUTE WILL TAKE YOU THROUGH (ROAD NAME). |
| | | × | × | — | × | NO MAIN ROUTE DEEMED TO EXIST |

FIG. 20

| 8. INTERSECTION(S) INCLUDED | FIRST INTERSECTION | LAST INTERSECTION | REMARKS |
|---|---|---|---|
| 8.1 ONE INTERSECTION TO PASS THROUGH | O | O | THIS ROUTE WILL TAKE YOU THROUGH (INTERSECTION NAME). |
|  | X |  | NO INTERSECTION DEEMED TO EXIST |
| 8.2 TWO OR MORE INTERSECTIONS TO PASS THROUGH | O | X | THIS ROUTE WILL TAKE YOU THROUGH (INTERSECTION NAME) AND THEN THROUGH (INTERSECTION NAME). |
|  | X | O | THIS ROUTE WILL TAKE YOU THROUGH (INTERSECTION NAME). |
|  | X | X | THIS ROUTE WILL TAKE YOU THROUGH (INTERSECTION NAME). |
|  |  |  | NO INTERSECTION DEEMED TO EXIST |

APPARATUS AND METHOD FOR NAVIGATION AND MEDIUM FOR PROVIDING THE METHOD

BACKGROUND OF THE INVENTION

The present invention relates to an apparatus and a method for navigation purposes, and a medium for providing the method. More particularly, the invention relates to an apparatus and a method for allowing a user to verify a determined route to the intended destination simply and reliably, as well as a medium for providing the inventive method.

Navigation apparatuses are coming into widespread use today. Once a user sets a destination on such an apparatus, the apparatus searches for and determines a route from the current or entered position to the intended destination and displays the route. When presented with the route thus determined, the user operates illustratively his or her vehicle accordingly to reach the destination without getting lost.

Some navigation systems are designed to prepare and display a list showing geographical points at which to make turns (e.g., intersections), and names of roads interconnecting a plurality of such points. Looking at the display, the user can verify an outline of the route determined by the system. The user may also ascertain key information about the determined route beforehand, such as whether any toll road is included in the route.

However, whenever the user wants to know such an outline of the proposed route on conventional navigation apparatuses, it is necessary to switch controls specifically to enter an outline display mode. In requiring the user to do such chores, the conventional system fails to address the user's need to start immediately for the destination in accordance with the determined route.

On grasping an overview of the determined route, the user must view the whole list that may be composed of a plurality of pages on display. This means that the user may have to perform operations to turn the pages while verifying the list. This can be a considerable drag on the operability of the navigation apparatus.

SUMMARY OF THE INVENTION

It is therefore an object of the present invention to provide an apparatus and a method for allowing a user to find out simply and rapidly an outline of a route searched for and determined by the apparatus and method.

Other objects, features and advantages of the invention will become more apparent upon a reading of the following description and appended drawings.

BRIEF DESCRIPTION OF THE DRAWINGS

FIG. 6 is an explanatory view outlining patterns;

FIG. 7 is an explanatory view showing typical abstracts corresponding to patterns determined in the processes of FIGS. 4 and 5;

FIG. 8 is an explanatory view showing other typical abstracts corresponding to other patterns determined in the processes of FIGS. 4 and 5;

FIG. 9 is an explanatory view showing other typical abstracts corresponding to other patterns determined in the processes of FIGS. 4 and 5;

FIG. 10 is an explanatory view showing other typical abstracts corresponding to other patterns determined in the processes of FIGS. 4 and 5;

FIG. 13 is an explanatory view showing typical abstracts corresponding to patterns determined in the processes of FIGS. 11 and 12;

FIG. 14 is an explanatory view showing other typical abstracts corresponding to other patterns determined in the processes of FIGS. 11 and 12;

FIGS. 15, 15A and 15B are explanatory views showing other typical abstracts corresponding to other patterns determined in the processes of FIGS. 11 and 12;

FIGS. 16, 16A and 16B are explanatory views showing other typical abstracts corresponding to other patterns determined in the processes of FIGS. 11 and 12;

FIG. 17 is an explanatory view showing other typical abstracts corresponding to other patterns determined in the processes of FIGS. 11 and 12;

FIG. 18 is an explanatory view showing other typical abstracts corresponding to other patterns determined in the processes of FIGS. 11 and 12;

FIG. 19 is an explanatory view showing other typical abstracts corresponding to other patterns determined in the processes of FIGS. 11 and 12; and FIG. 20 is an explanatory view showing other typical abstracts corresponding to other patterns determined in the processes of FIGS. 11 and 12.

DESCRIPTION OF THE PREFERRED EMBODIMENTS

Preferred embodiments of this invention are described below. Means and steps claimed as constituting the invention will be described using specific examples in parentheses where appropriate. However, such specifics are only for illustration purposes and are not limitative of the invention.

Figure 1:
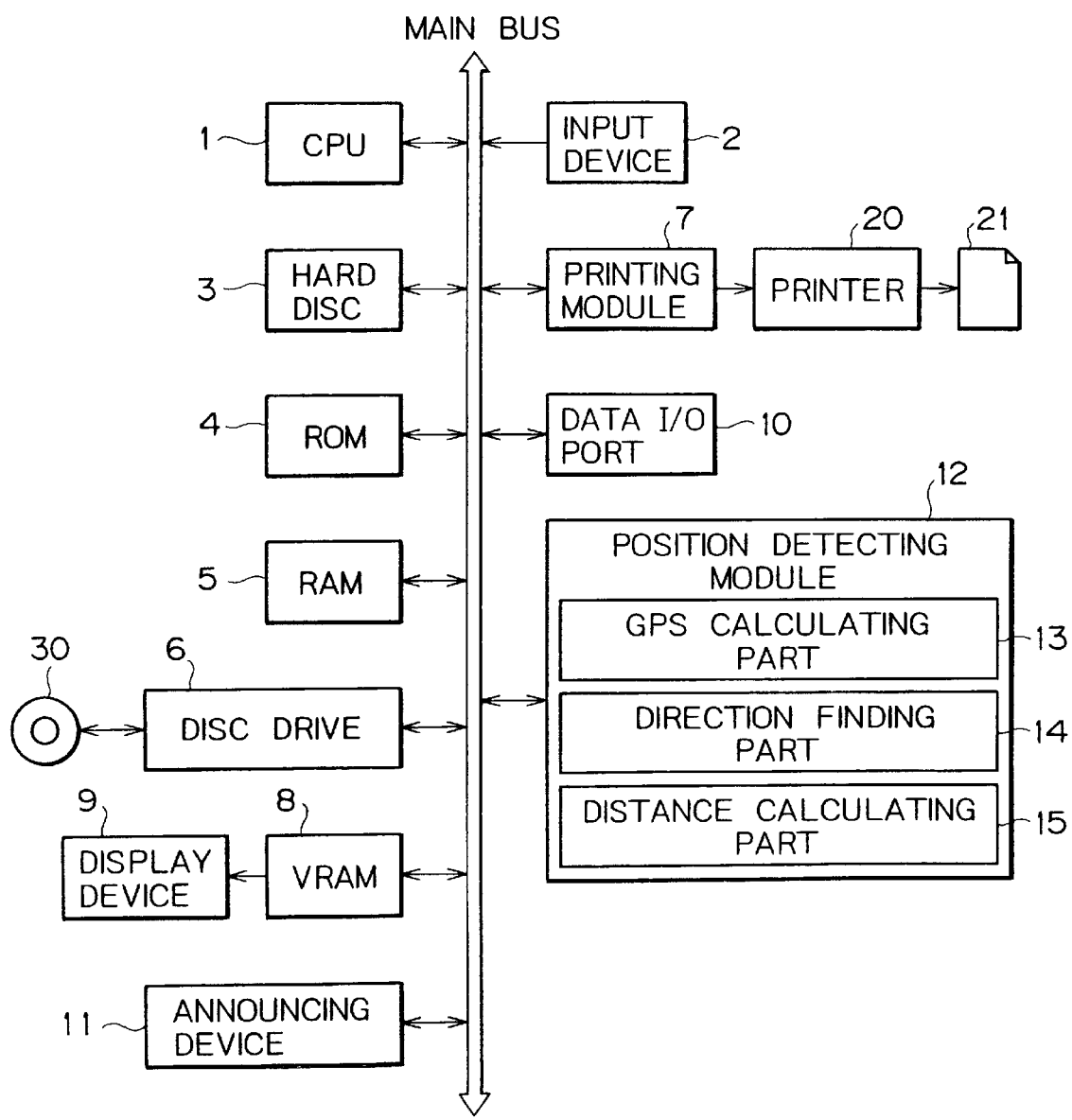
FIG. 1 is a block diagram of a navigation apparatus embodying the invention.

FIG. 1 outlines a typical structure of a navigation apparatus embodying the invention. In FIG. 1, component parts of the apparatus are connected to a CPU (central processing unit) 1 via a main bus. The CPU 1 runs on an OS (operating system) and executes application software stored on a hard disc 3 as well as various programs held in a ROM 4, thereby controlling the workings of the components interconnected via the main bus.

The hard disc 3 stores the OS and application programs, and allows text data, image data, audio data and other various file data to be recorded and reproduced thereto and therefrom. The hard disc 3 is also used to record and reproduce large quantities of image data such as geographical data.

A RAM 5 is a working RAM that temporarily accommodates data primarily during data processing of the CPU 1.

An input device 2 is constituted illustratively by a mouse, a keyboard, a touch switch, a pen input device and/or the like. The input device 2 converts inputs from a user into data available within the apparatus. The input device 2 is used to input specific point setting information such as a point of departure, the intended destination, and stopover points necessary for automatic route search, as well as calculating condition setting information such as whether priority should be given to distance or to time. Giving priority to distance means that the route of the shortest distance is to be searched for during automatic route search; priority on time signifies that the route requiring the shortest possible time to travel should be searched for.

A disc drive 6 drives a disc-like storage medium such as a CD-ROM, a floppy disc and/or a DVD (digital versatile disc), reads data from the medium and, if the medium is of a writable type, writes data thereto as needed. If a disc that holds digital map data (called the map disc 30 hereunder) is loaded as the disc-like storage medium, the disc drive 6 reads digital map data from the disc 30. The map disc 30 may contain all types of information that may be recorded on navigation data discs being marketed today, such as: distances on maps; legally prescribed speed limits on specific roads, the number of traffic lights along a given road; the number of lanes on a particular road; and lists of intersections; sightseeing and shopping guide information; voice information for route guidance and other audio information; and text information in characters.

A data I/O port 10 accommodates illustratively a digital data I/O terminal or a semiconductor memory device such as a memory card, and is designed to communicate with an external device on a wired or wireless basis over a network. In operation, the data I/P port 10 permits input and output of data through the data I/O terminal, or to and from a memory card or a display-equipped portable digital assistant, among others. Digital map data may be supplied to the apparatus not only from the map disc 30 but also through the data I/O port 10 by means of communication.

A display device 9 may be any one of a CRT (cathode-ray tube), a liquid crystal display, a plasma display and other display devices. The display device 9 generates video signals based on image data and text data that are created and stored into a VRAM 8 as will be described later, and displays images and characters represented by such video signals. A display screen of the display device 9 primarily displays map images and characters.

An announcing device 11 generates analog audio signals based illustratively on audio data generated by the CPU 1, and makes announcements via a built-in speaker in accordance with the audio signals.

When an automatic route search is specified, the CPU 1 calculates an optimum route to the intended destination by referring to diverse parameters retrieved from the map disc 30 (described later in more detail) such as distances, legal speed limits, number of traffic lights, number of lanes, presence of one-way traffic, and restricted access to roads; as well as by referencing a calculating condition parameter which, entered from the input device 2, designates priority being given either to time or to distance. Naturally, the calculated routes are not limited to vehicle uses alone; optimum walking or bicycling routes may also be computed. In the latter case, the CPU 1 retrieves such parameters as walking or bicycling speeds of users from the map disc 30 for calculation. The routes for walking or bicycling purposes may pass through places not accessible by vehicles.

A printing module 7 receives so-called rally map data created by the CPU 1, and generates print data for printing rally maps illustratively on an A4-size sheet of paper in the longitudinal direction. (The rally map is an image that comprises enlarged maps of intersections selected as necessary for reaching the intended destination, along with character strings of additional information for guidance related to each intersection.)

A printer 20 prints rally maps longitudinally on an A4-size sheet of paper on the basis of print data supplied by the printing module 7.

A position detecting module 12 includes a GPS calculating part 13, a direction finding part 14, and a distance calculating part 15 which are designed to detect the current location. The GPS calculating part 13 receives radio waves from a satellite, not shown, to compute the present location based on the data contained in the received radio waves. The direction detecting part 14 is constituted illustratively by a gyro sensor that detects the direction in which the navigation apparatus is heading. The distance calculating part 15 calculates the distance traveled on the basis of the distance from a given point of departure.

How the inventive navigation apparatus operates will now be described with reference to the flowchart of FIG. 2. First of all, In step S1, the user inputs a desired destination by manipulating the input device 2. At this point, the CPU 1 causes the disc drive 6 to retrieve from the map disc 30 a map comprising the position corresponding to the entry made from the input device 2. The retrieved map is written to the VRAM 8 and displayed on the display device 9. The user ascertains and then designates the location of the intended destination on the map displayed on the display device 9. The CPU 1 places the input destination into the RAM 5 for temporary storage.

In step S2, the user likewise inputs a point of departure. This point is also stored into the RAM 5. The entry of the point of departure is optional. That is, when omitted, the point of departure is considered to be the same as the current location.

In step S3, the user inputs search conditions by operating the input device 2. The search conditions include priority given to distance or to time, as well as stopover locations, among others.

In step S4, the CPU 1 searches for the optimum route from the point of departure input in step S2 or from the current location to the destination input in step S1. The search is carried out in accordance with the search conditions entered in step S3. Illustratively, if the priority on distance was input in step S3, the CPU 1 searches for the route of the shortest distance; if the priority on time was entered, the CPU 1 searches for the route requiring the shortest time to travel to the destination regardless of a prolonged distance that could be necessitated by passage through, say, an expressway.

In step S5, the CPU 1 determines one of prerecorded patterns that matches the route searched for in step S4. Details of the pattern determination will be described later with reference to the flowcharts of FIG. 4 and 5. What takes place in step S5 is that one of the previously prepared patterns is judged to be applicable to the route searched for and selected. The hard disc 3 retains data representing route abstracts, to be prepared in step S7 as will be described later. The use of an abstract corresponding to the applicable pattern is determined.

In step S6, the CPU 1 extracts, from the route information searched for in step S4, information that is needed for the preparation of a route abstract in step S7. Illustratively, the CPU 1 picks the names of roads and intersections included in the route.

In step S7, the CPU 1 prepares a route abstract. Specifically, the CPU 1 reads from the hard disc 3 a prerecorded template corresponding to the pattern determined in step S5, and pairs the template with the information extracted in step S6 to prepare the route abstract.

Figure 3:
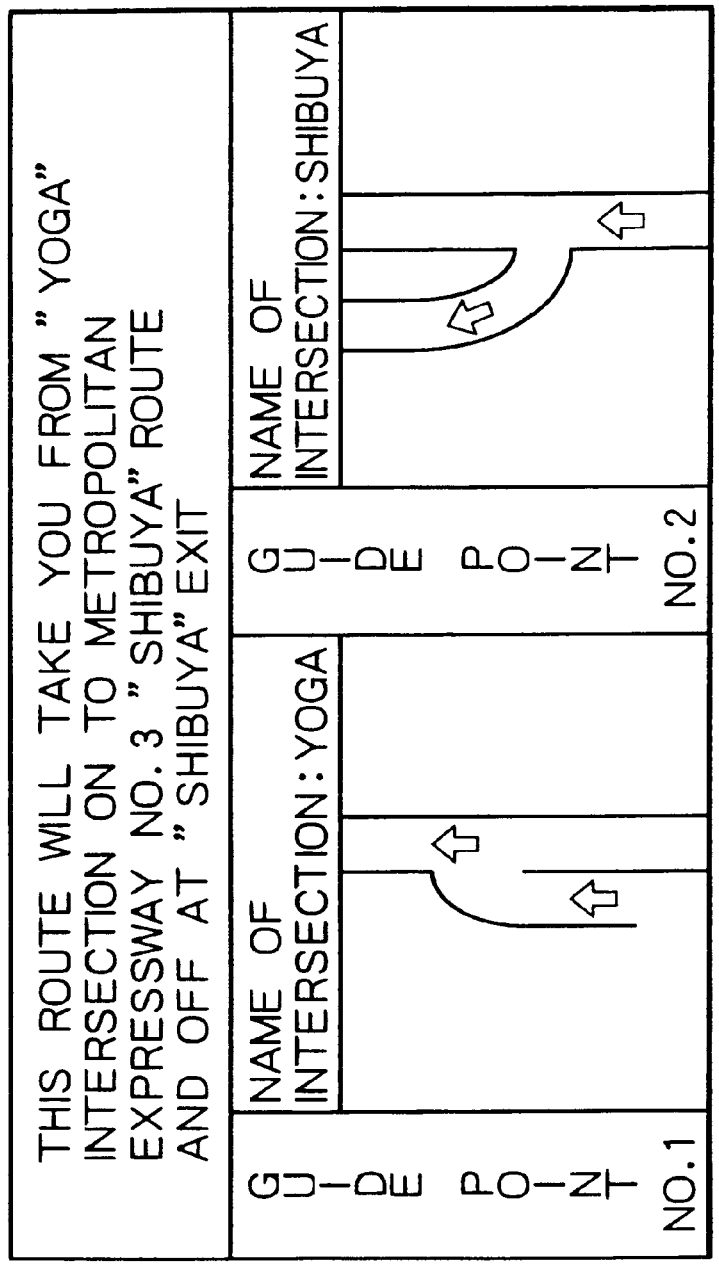
FIG. 3 is a schematic view of what is displayed in step S8 of FIG. 2.

In step S8, the CPU 1 renders on the display device 9 a text of the route abstract prepared in step S7. FIG. 3 shows a typical display example of the rendered text.

In this display example, a text "THIS ROUTE WILL TAKE YOU FROM "YOGA" INTERSECTION ON TO METROPOLITAN EXPRESSWAY NO. 3 "SHIBUYA" ROUTE AND OFF AT "SHIBUYA" EXIT" appears as an abstract of the route. In the example, the CPU 1 reads out and displays enlarged maps (rally maps) of the intersections corresponding to the extracted intersection names.

In step S9, the user determines whether or not to print the abstract displayed in step S8. If the abstract is desired to be printed, step S10 is reached. In step S10, the user enters a print command by manipulating the input device 2. The command causes the CPU 2 to read out the abstract of the route displayed on the display device 9 along with the rally maps (such as the image data displayed on the display device 9 as shown in FIG. 3), and supplies the abstract and the maps to the printing module 7. In turn, the printing module 7 feeds the received image data to the connected printer 20 so that the latter will print the data on a paper 21.

If the user decides that there is no need to print the text information displayed in step S8, the process of step S10 is skipped.

In step S11, the user operates the input device 2 to designate the starting of guidance regarding the route searched for and selected. In step S12, the CPU 1 supplies the announcing device 11 with the route abstract (in text) prepared in step S7. The announcing device 11 converts the input abstract into voice that is output from the speaker. For example, if the user has designated a search for a route from his or her home to a particular golf course, the announcing device 11 may voice the name of the interchange through which to gain access to an expressway, the name of the expressway, and the name of the expressway through which to exit from the expressway. The announcement allows the user to know an outline of the selected route (i.e., route abstract).

Where a guide start input is effected by the user through the input device 2 in step S11, the input when accepted triggers the starting of route guidance. Arrangements may be made so that if a guide start input is not carried out within a predetermined period of time, guidance may be started anyway upon elapse of that period of time.

In step S13, the CPU 1 executes guide processing by controlling the relevant components. Specifically, the CPU 1 causes the position detecting module 12 to detect the current location, gets the disc drive 6 to read from the map disc 30 map data including the detected current location, and outputs the retrieved map data to the display device 9 via the VRAM 8 for display. At this point, the CPU 1 draws a mark pointing to the current location on the map displayed by the display device 9. The marking allows the user illustratively to run the vehicle along the route.

In step S14, the CPU 1 checks to see if the current location has become the same as the intended destination. If the destination has yet to be reached, step S15 is reached. In step S15, a check is made to see if an end to the guide processing is designated. If termination of the guidance has yet to be designated, step S13 is reached again so that the guide processing will continue. If the current location is judged to be the same as the destination in step S14, or if the user is judged to have designated an end to the guide in step S15 by operating the input device 2, then the guide processing is terminated.

The pattern determining process of step S5 in FIG. 2 will now be described in detail by referring to the flowcharts of FIGS. 4 and 5. Steps S21 through S24 take place as follows: the CPU 1 checks to see whether a toll road is included in the route searched for and selected in step S4 (in step S21), whether a national route is included (in step S22), whether a main route is included (in step S23), or whether an intersection is included (in step S24). As shown in FIG. 6, the above checks determine which of several basic patterns the route in question belongs to: a pattern including a toll road (pattern 1), a pattern including a national route (pattern 2), a pattern including a toll road and a national route (pattern 3 or 4), a pattern including a national route and a main route (pattern 5 or 6), a pattern including a main route (pattern 7), or a pattern including an intersection alone (pattern 8).

If it is judged in step S21 that the applicable pattern includes a toll road, step S25 is reached. In step S25, a check is made to see if the length of the toll road amounts to at least 70 percent of the entire length of the route. If there are two or more toll roads, their lengths are totaled to make up the toll road length. If the length of the toll road is found to be at least 70 percent of the entire route length, the basic pattern is judged to be pattern 1, and step S26 is reached. In step S26, a check is made to see if the number of toll roads is one, two, or at least three. If there is one toll road, step S27 is reached in which the applicable pattern is judged to be pattern 1.1. If there are two toll roads, step S28 is reached in which the applicable pattern is judged to be pattern 1.2. If there are at least three toll roads, step S29 is reached in which the applicable pattern is judged to be pattern 1.3.

If in step S25 the toll road length is found to be less than 70 percent of the entire route length, step S30 is reached. In step S30, a check is made to see if a national route exists before or after the toll road. If there exits no national route before or after the toll road, step S26 is reached in which the same process as that of pattern 1 is carried out.

If in step S30 a national route is found to exist before or after the toll road, step S31 is reached. In step S31, a check is made on the location of the national route, i.e., either before or after the toll road.

If in step S31 the national route is found to exist before the toll road, the basic pattern is judged to be pattern 3 and step S32 is reached. In step S32, a check is made to see if the number of toll roads is one, two, or at least three. If there is one toll road, step S33 is reached in which the applicable pattern is judged to be pattern 3.1. If there are two toll roads, step S34 is reached in which the applicable pattern is judged to be pattern 3.2. If there are at least three toll roads, step S35 is reached in which the applicable pattern is judged to be pattern 3.3.

If in step S31 the national route is found to exist after the toll road, the basic pattern is judged to be pattern 4 and step S36 is reached. In step S36, a check is made to see if the number of toll roads is one, two, or at least three. If there is one toll road, step S37 is reached in which the applicable pattern is judged to be pattern 4.1. If there are two toll roads, step S38 is reached in which the applicable pattern is judged to be pattern 4.2. If there are at least three toll roads, step S39 is reached in which the applicable pattern is judged to be pattern 4.3.

If in step S21 no toll road is found to be included in the route, step S22 is reached. In step S22, a check is made to see if the route includes a national route. If a national route is found to be included, step S40 is reached. In step S40, a check is made to see if the length of the national route amounts to at least 70 percent of the entire length of the route (if there are two or more national routes, their lengths are totaled to make up the entire national route length). If the length of the national route is found to be at least 70 percent of the entire route length, the basic pattern is judged to be pattern 4 and step S41 is reached. In step S41, a check is made to see if the number of national routes is one, two, or at least three. If there is one national route, step S42 is reached in which the applicable pattern is judged to be pattern 2.1. If there are two national routes, step S43 is reached in which the applicable pattern is judged to be pattern 2.2. If there are at least three national routes, step S44 is reached in which the applicable pattern is judged to be pattern 2.3.

If in step S40 the national route length is judged to be less than 70 percent of the entire route, step S45 is reached. In step S45, a check is made to see if a main route is included in the selected route. If no main route is found to be included, the basic pattern is judged to be pattern 2 and step S41 is reached in which the same process as that described above is repeated.

If in step S45 a main route is judged to exist before or after the national route, step S46 is reached. In step S46, a check is made to see whether the main route is located before or after the national route, If the main route is found to be located before the national route, the basic pattern is judged to be pattern 5 and step S47 is reached. In step S47, a check is made on the number of national routes. If there is one national route, step S48 is reached in which the applicable pattern is judged to be pattern 5.1. If there are two national routes, step S49 is reached in which the applicable pattern is judged to be pattern 5.2. If there are at least three national routes, step S50 is reached in which the applicable pattern is judged to be pattern 5.3.

If in step S46 the main route is found to exist after the national route, step S51 is reached. In step S51, a check is made on the number of national routes. If there is one national route, the basic pattern is judged to be pattern 6 and step S52 is reached. In step S52, the applicable pattern is judged to be pattern 6.1. If there are two national routes, step S53 is reached in which the applicable pattern is judged to be pattern 6.2. If there are at least three national routes, step S54 is reached in which the applicable pattern is judged to be pattern 6.3.

If in step S22 no national route is found to be included in the selected route, step S23 is reached. In step S23, a check is made to see if the route includes a main route. If a main route is found to be included, the basic pattern is judged to be pattern 7 and step S55 is reached. In step S55, a check is made to see if the number of main routes is one, two or at least three. If there is one main route, step S56 is reached in which the applicable pattern is judged to be pattern 7.1. If there are two main routes, step S57 is reached in which the applicable pattern is judged to be pattern 7.2. If there are at least three main routes, step S58 is reached in which the applicable pattern is judged to be pattern 7.3.

If in step S23 no main route is found to be included in the route, step S24 is reached. In step S24, a check is made to see if an intersection is included in the selected route. If an intersection is found to be included in the route, the basic pattern is judged to be pattern 8 and step S59 is reached. In step S59, a check is made to see on the number of intersections. If there is one intersection, step S60 is reached in which the applicable pattern is judged to be pattern 8.1. If there are two intersections, step S61 is reached in which the applicable pattern is judged to be pattern 8.2.

If in step S24 no intersection is found to be included in the route, step S62 is reached in which no applicable pattern is judged to exist. In that case, there is no template and no abstract of the route is output.

When the pattern of the selected route is determined as described above, an abstract applicable to that pattern is prepared in step S7. Abstract templates listed in FIGS. 7 through 10 are used in preparing the applicable abstract.

Illustratively, as shown in FIG. 7, pattern 1.1 is matched with the template "THIS ROUTE WILL TAKE YOU FROM (INTERSECTION NAME) ON TO (ROAD NAME) AND OFF AT (EXIT NAME)" which is stored beforehand on the hard disc 3. In the information extracting process of step S6 in FIG. 2, "Yoga" intersection may be extracted as the intersection name, Metropolitan Expressway No. 3 "Shibuya" route as the road name, and "Shibuya" exit as the exit name. The extracted information is applied to the template in question so that in step S7, an abstract "THIS ROUTE WILL TAKE YOU FROM "YOGA" INTERSECTION ON TO METROPOLITAN EXPRESSWAY NO. 3 "SHIBUYA" ROUTE AND OFF AT "SHIBUYA" EXIT" is prepared.

For pattern 1.2, there is provided a template "THIS ROUTE WILL TAKE YOU FROM (INTERSECTION NAME) ON TO (ROAD NAME) AND OFF (ROAD NAME) AT (EXIT NAME)." Illustratively, "Shibuya" intersection may be extracted as the intersection name, Metropolitan Expressway No. 3 "Shibuya" route as the name of the road to gain access to, the Metropolitan Express Beltway as the name of the road to exit from, and "Shiba-koen" exit as the intersection through which to leave the exit road. The extracted information is used to prepare an abstract "THIS ROUTE WILL TAKE YOU FROM "SHIBUYA" INTERSECTION ON TO METROPOLITAN EXPRESSWAY NO. 3 "SHIBUYA" ROUTE AND OFF THE METROPOLITAN EXPRESS BELTWAY AT "SHIBA-KOEN" EXIT."

Abstracts of other patterns, although not described further, are prepared likewise as shown in FIGS. 7 through 10. The extracted information is applied to suitable templates that were provided previously.

Figure 2:
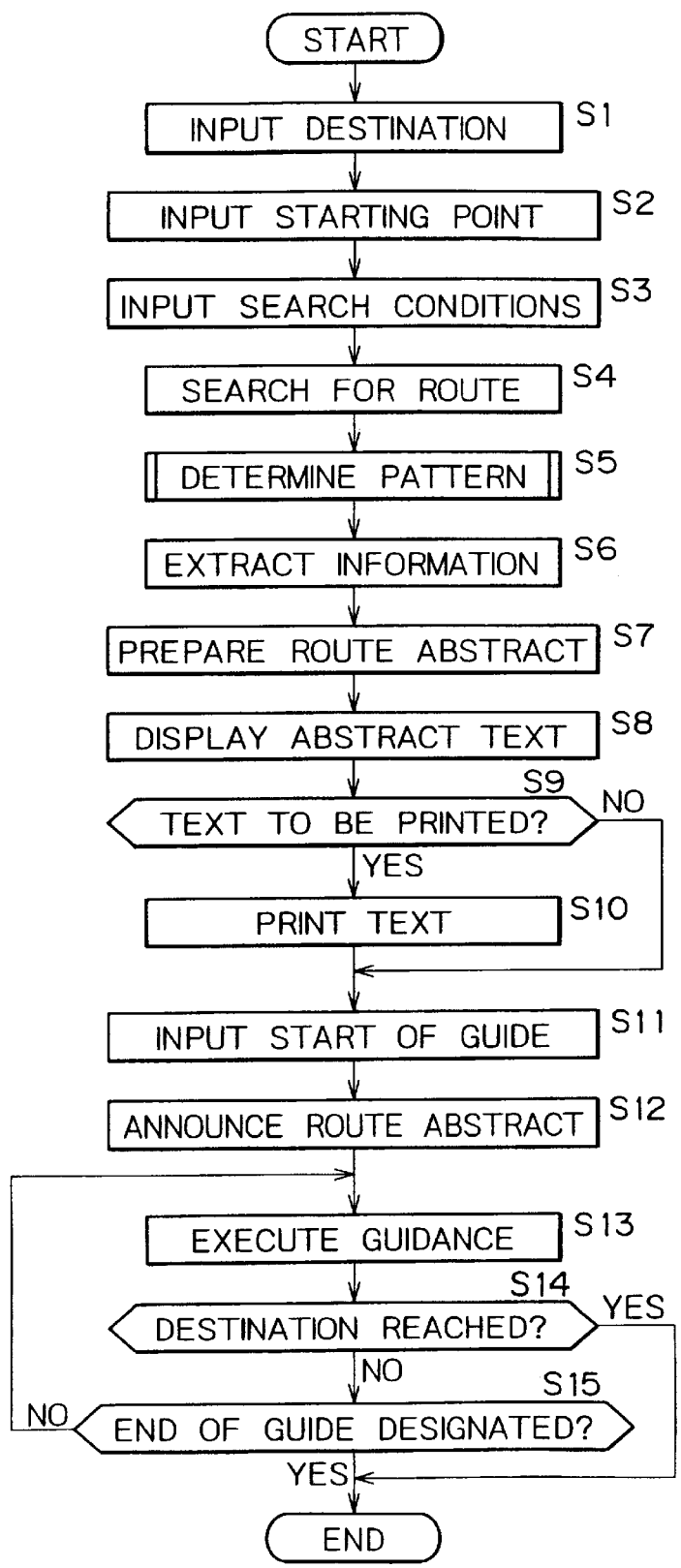
FIG. 2 is a flowchart of steps in which the navigation apparatus of FIG. 1 typically operates.
Figure 11:
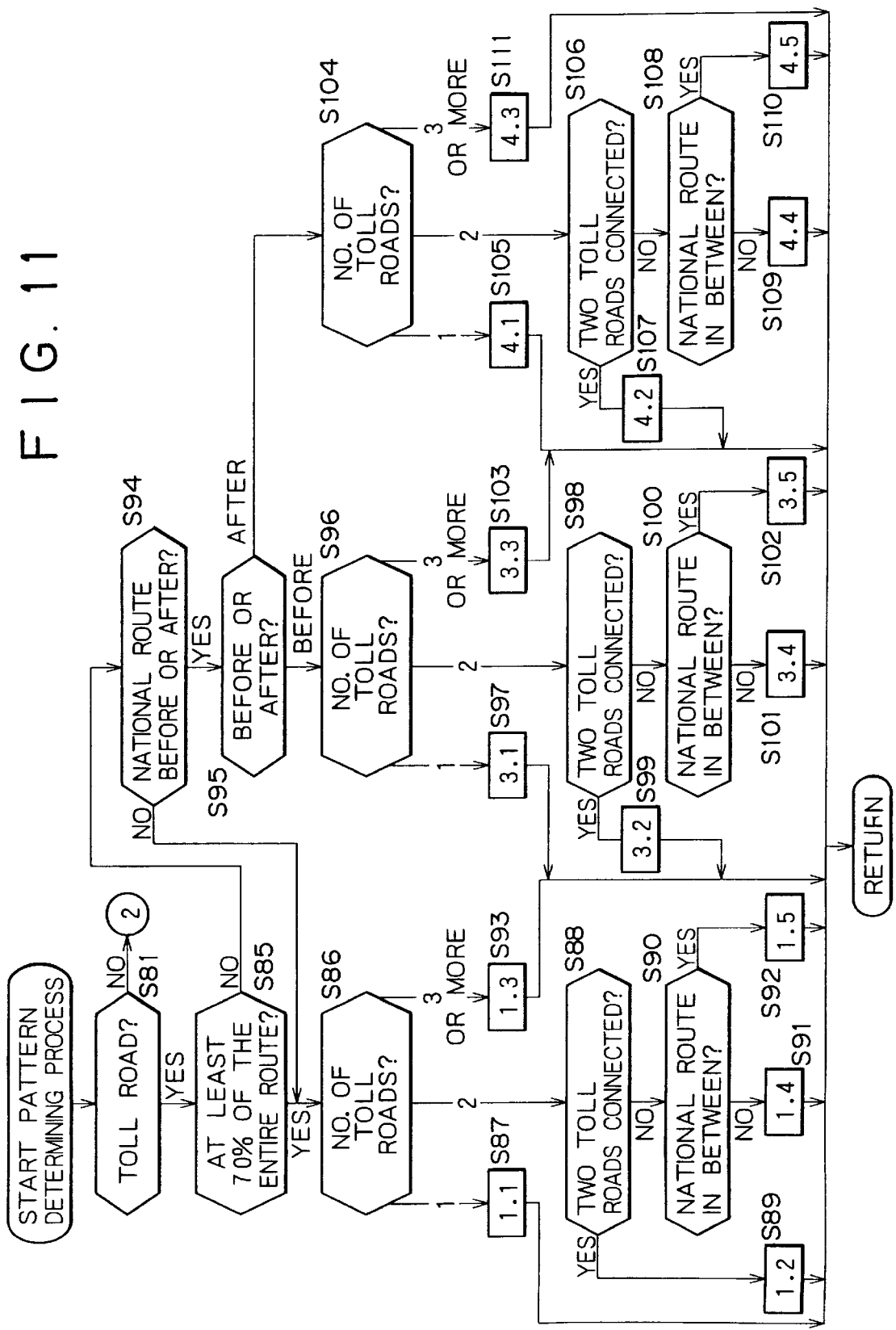
FIG. 11 is a flowchart of steps constituting another pattern determining process performed in step S5 of FIG. 2.
Figure 12:
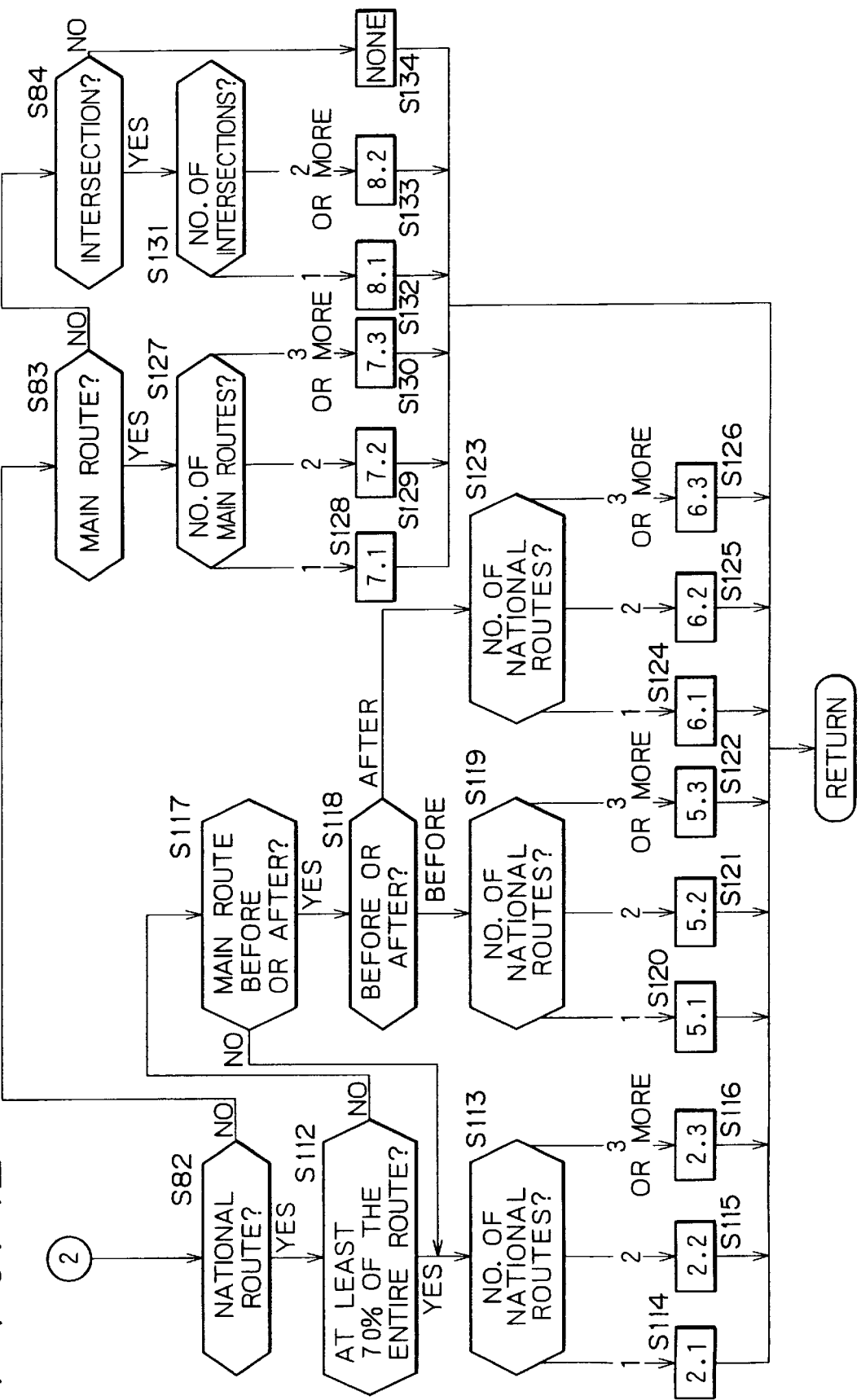
FIG. 12 is a flowchart of steps constituting another pattern determining process carried out in step S5 of FIG. 2.

FIGS. 11 and 12 depict other typical pattern determining processes of step S5 in FIG. 2. The two figures include steps S81 through S134 that are basically the same as steps S21 through S62 shown in FIGS. 4 and 5. The difference is that the basic pattern 1 comprises patterns 1.4 and 1.5 in addition to patterns 1.1 through 1.3; that the basic pattern 3 includes patterns 3.4 and 3.5 besides patterns 3.1 through 3.3; and that the basic pattern 4 has patterns 4.4 and 4.5 along with patterns 4.1 through 4.3.

If in step S86 the number of toll roads is found to be two, step S88 is reached in which a check is made to see if the two toll roads are connected. If the two toll roads are found to be connected, step S89 is reached in which the applicable pattern is judged to be pattern 1.2. If the two toll roads are not connected, step S90 is reached in which a check is made to see if there is a national route between the two toll roads. If the road between the two toll roads is not a national road, step S91 is reached in which the applicable pattern is judged to be pattern 1.4. If a national round is found to exist between the two toll roads, step S92 is reached in which the applicable pattern is judged to be pattern 1.5.

If in step S96 the number of toll roads is judged to be two, step S98 is reached in which a check is made to see if the two toll roads are connected. If the two toll roads are found to be connected, step S99 is reached in which the applicable pattern is judged to be pattern 3.2. If the two toll roads are not connected, step S100 is reached in which a check is made to see if there is a national route between the two toll roads. If the road between the two toll roads is not a national route, step S101 is reached in which the applicable pattern is judged to be pattern 3.4. If a national route is found to exist between the two toll roads, step S102 is reached in which the applicable pattern is judged to be 3.5.

If in step S104 the number of toll roads is judged to be two, step S106 is reached in which a check is made to see if the two toll roads are connected. If the two toll roads are found to be connected, step S107 is reached in which the applicable pattern is judged to be pattern 4.2. If the two toll roads are not connected, step S108 is reached in which a check is made to see if there is a national route between the two toll roads. If the road between the two toll roads is not a national route, step S109 is reached in which the applicable pattern is judged to be pattern 4.4. If a national route is found to exist between the two toll roads, step S110 is reached in which the applicable pattern is judged to be 4.5.

Figure 4:
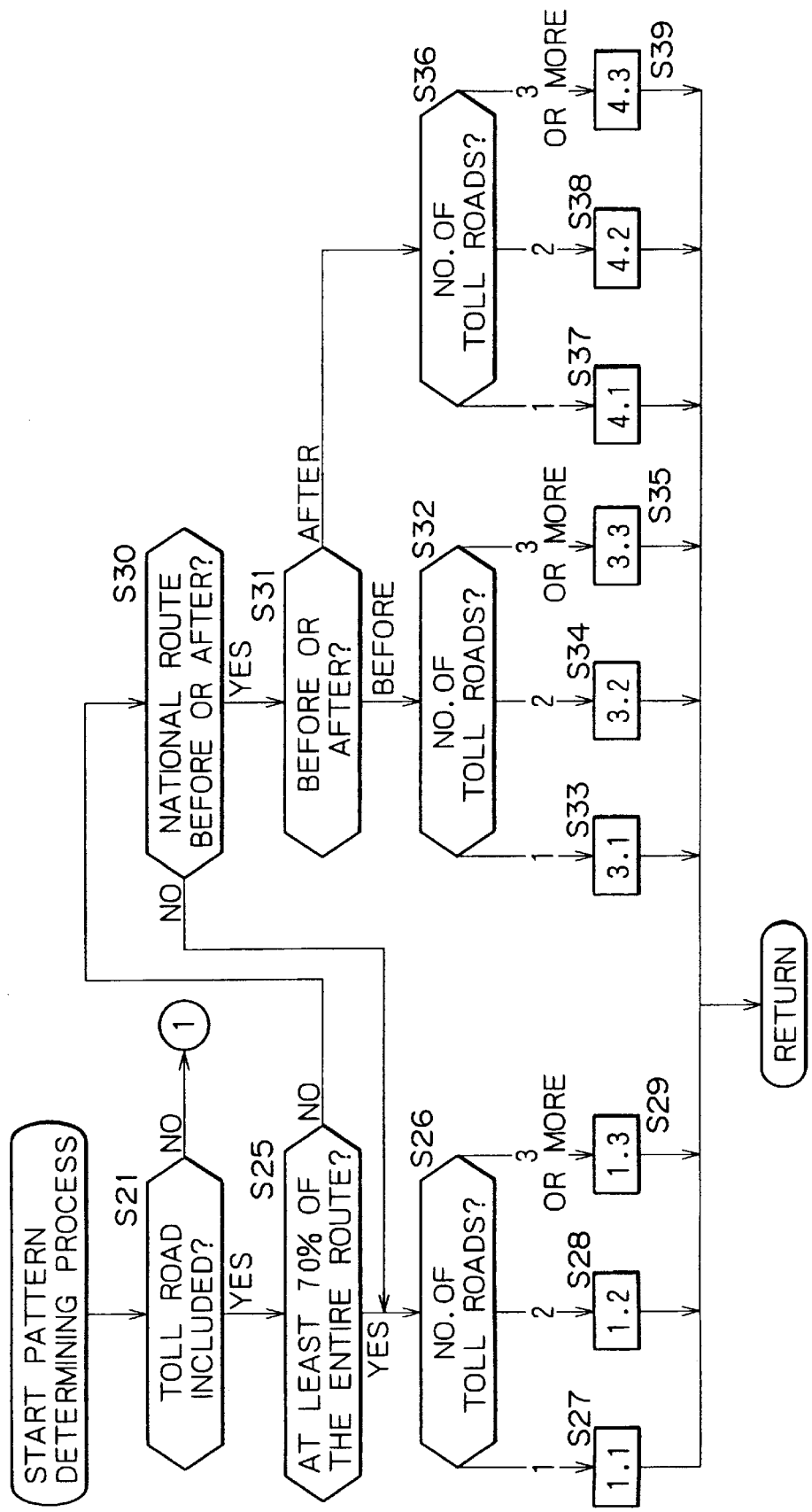
FIG. 4 is a flowchart of steps constituting a pattern determining process performed in step S5 of FIG. 2.
Figure 5:
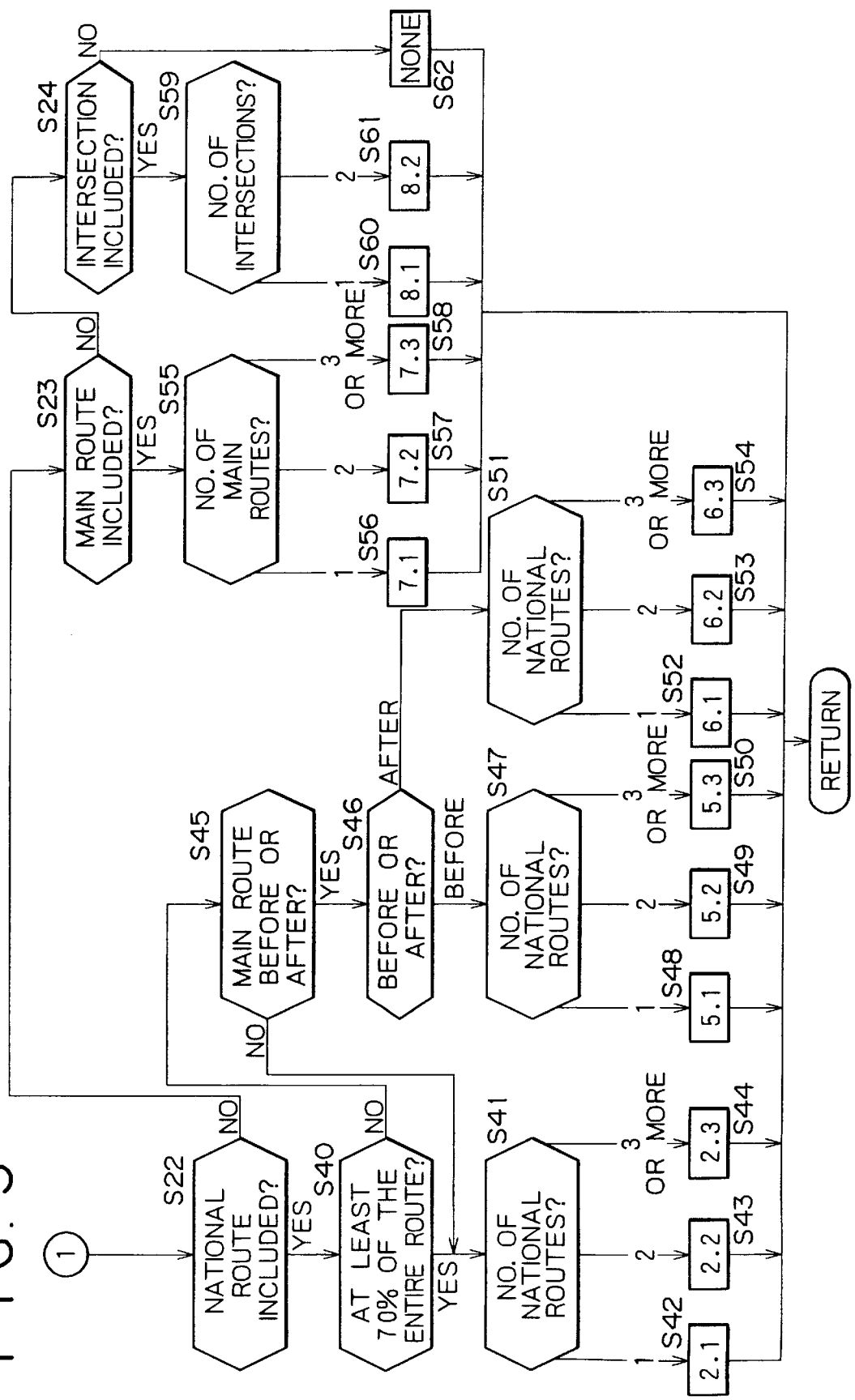
FIG. 5 is a flowchart of steps constituting another pattern determining process carried out in step S5 of FIG. 2.

The other pattern determining steps are the same as those depicted in FIGS. 4 and 5 and thus will not be described further.

Examples of templates applicable to the processes in FIGS. 11 and 12 are listed in FIGS. 13 through 20. For pattern 1.4, as shown in FIG. 13, the template applied to pattern 1.2 is utilized. For pattern 1.5, the template applied to pattern 1.3 is employed.

For pattern 3.4, as depicted in FIG. 15, the template applied to pattern 3.2 is utilized. For pattern 3.5, the template applied to pattern 3.3 is used.

For pattern 4.4, as indicated in FIG. 16, the template applied to pattern 4.2 is employed. For pattern 4.5, the template applied to pattern 4.3 is utilized.

In FIGS. 13 through 20, a circle (o) denotes the presence of an applicable name. A cross (x) either represents the absence of appropriate data or indicates that the name is not stored. A dash (–) shows that the object in question is indefinite.

For pattern 1.1, there may be illustratively a case in which there exist names for the road to take, the intersection to enter, and the intersection to exit from. In that case, there is provided an abstract "THIS ROUTE WILL TAKE YOU FROM (INTERSECTION NAME) ON TO (ROAD NAME) AND OFF AT (EXIT NAME)." If the name of the intersection to exit from does not exist, an abstract "THIS ROUTE WILL TAKE YOU FROM (INTERSECTION NAME) ON TO (ROAD NAME)" is prepared. If the name of the intersection to enter does not exist, there is provided an abstract "THIS ROUTE WILL TAKE YOU ON TO (ROAD NAME) AND OFF AT (EXIT NAME)." If there is only the name of the road to take and there exist no names for intersections to enter and to exit from, then there is provided an abstract "THIS ROUTE WILL TAKE YOU THROUGH (ROAD NAME)." If there is no name for the road to take, then no toll road is considered to exist, and processing is carried out accordingly.

For pattern 1.3, there may be illustratively a case in which there are names for the road to take, the road to exit from, the intersection to enter, the intersection to exit from, and the road to pass through. In that case, there is provided an abstract "THIS ROUTE WILL TAKE YOU FROM (INTERSECTION NAME) ON TO (ROAD NAME), THROUGH (ROAD NAME), AND OFF (ROAD NAME) AT (EXIT NAME)."

It should be noted that "the road to pass through" is the longest road other than the first or the last road to take.

In the example above, the suitable abstract is prepared (but not described in specific terms) by selecting one of the previously provided templates depending on the existence of data about the road to take, the road to exit from, the intersection to enter, the intersection to exit from, and the road to pass through.

A computer program designed to perform the above-described processes may be offered to users by use of such storage media as magnetic discs, CD-ROMs and solid-state memory, as well as through communication media such as wired networks and satellite links.

The above-described inventive navigation apparatus, navigation method, and medium for providing the method allow extracted information to be applied to predetermined patterns to prepare and output abstracts of routes searched for and selected with regard to destinations. This makes it possible for the user to know an outline of a specifically selected route in a rapid and reliable manner without resorting to complicated manipulations. The user is then able to determine whether a suitable route to the intended destination has been selected. If necessary, the user may reject the selected route and initiate another search for a better route to the destination in question.

As many apparently different embodiments of this invention may be made without departing from the spirit and scope thereof, it is to be understood that the invention is not limited to the specific embodiments thereof except as defined in the appended claims.

What is claimed is:

1. A navigation apparatus comprising:
   inputting means for receiving a destination and one or more priorities for route searching from a user, said priorities comprising distance, time and stopover locations;
   searching means for searching for a route to said destination;
   determining means for determining a pattern of said route searched for by said searching means;
   extracting means for extracting information pertaining to said route searched for by said searching means;
   preparing means for preparing an abstract of said route by applying said information extracted by said extracting means to said pattern determined by said determining means, wherein said abstract comprises a verbal summary of said route; and
   outputting means for outputting said abstract of said route prepared by said preparing means.

2. A navigation apparatus according to claim 1, wherein said determining means carries out the determination based on types of roads and on intersections included in said route searched for by said searching means.

3. A navigation apparatus according to claim 2, wherein said determining means carries out the determination based on whether said roads are toll roads, on whether said roads are national routes, on how many roads are included, on where said roads are located and on what percentage said roads amount to with respect to an entire route length.

4. A navigation apparatus according to claim 1, wherein said preparing means includes, in said abstract of said route searched for by said searching means, at least an entry and an exit to and from a road included in said route.

5. A navigation method comprising the steps of:
   searching for a route to a destination;
   determining which predetermined pattern among a plurality of predetermined patterns best matches a pattern of said routed searched for in said searching step;

extracting information pertaining to said route searched for in said searching step;

preparing an abstract of said route by applying said information extracted in said extracting step to a prerecorded verbal template corresponding with said pattern determined in said determining step, wherein said abstract comprises a verbal summary of said route; and outputting, in verbal form, said abstract of said route prepared in said preparing step.

6. A providing medium for providing a program in a manner readable by a computer for execution by a navigation apparatus, said program comprising the steps of:

searching for a route to a destination;

determining which predetermined pattern among a plurality of predetermined patterns best matches a pattern of said route searched for in said searching step;

extracting information pertaining to said route searched for in said searching step;

preparing an abstract of said route by applying said information extracted in said extracting step to a prerecorded verbal template corresponding with said pattern determined in said determining step, wherein said abstract comprises a verbal summary of said route; and outputting, in verbal form, said abstract of said route prepared in said preparing step.

7. A navigation apparatus according to claim 1, wherein said determining means determines whether one of a plurality of predetermined patterns is applicable to said route searched for by said searching means.

8. A navigation apparatus according to claim 1, wherein said outputting means displays a guide point corresponding to said abstract.

9. A navigation method according to claim 5, wherein said outputting step comprises outputting a guide point corresponding to said abstract.

10. A navigation method according to claim 5, wherein said determining step is based on types of roads and on intersections included in said route searched for in said searching step.

11. A navigation method according to claim 5, wherein said abstract prepared in the preparing step comprises at least an entry to and an exit from a road included in said route.

12. A medium according to claim 6, wherein said outputting step of said program comprises displaying a guide point corresponding to said abstract.

13. A medium according to claim 6, wherein said determining step of said program is based on types of roads and on intersections included in said route searched for in said searching step.

14. A medium according to claim 6, wherein said abstract prepared in the preparing step of said program comprises at least an entry to and an exit from a road included in said route.

15. A navigation method according to claim 10, wherein said determining step comprises determining:

whether said roads are toll roads;

whether said roads are national routes;

how many roads are included;

where said roads are located; and what percentage of an entire route length is occupied by said roads.

16. A medium according to claim 13, wherein said determining step comprises determining:

whether said roads are toll roads;

whether said roads are national routes;

how many roads are included;

where said roads are located; and what percentage of an entire route length is occupied by said roads.

17. A navigation apparatus according to claim 1, wherein the outputting means further comprises means for generating a rally map, and wherein the rally map is an image which comprises enlarged maps of intersections selected as necessary for reaching the intended destination, along with character strings of additional information for guidance related to each intersection.

18. A navigation method according to claim 5, wherein the outputting step further comprises the step of generating a rally map, and wherein the rally map is an image which comprises enlarged maps of intersections selected as necessary for reaching the intended destination, along with character strings of additional information for guidance related to each intersection.

* * * * *

UNITED STATES PATENT AND TRADEMARK OFFICE
CERTIFICATE OF CORRECTION

PATENT NO. : 6,205,398 B1  
DATED : March 20, 2001  
INVENTOR(S) : Masahiro Kobayashi et al.

It is certified that error appears in the above-identified patent and that said Letters Patent is hereby corrected as shown below:

Column 10,
Line 47, in second occurrence of outputting insert -- in verbal form-- before "said".

Signed and Sealed this

Twelfth Day of March, 2002

Attest:

JAMES E. ROGAN
*Attesting Officer*  *Director of the United States Patent and Trademark Office*